US008521968B2

(12) United States Patent
Hatula et al.

(10) Patent No.: US 8,521,968 B2
(45) Date of Patent: Aug. 27, 2013

(54) MEMORY CONTROLLER AND METHODS

(71) Applicant: Renesas Mobile Corporation, Tokyo (JP)

(72) Inventors: Ari Petteri Hatula, Oulu (FI); Mika Tapani Lehtonen, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/650,935

(22) Filed: Oct. 12, 2012

(65) Prior Publication Data

US 2013/0097394 A1     Apr. 18, 2013

Related U.S. Application Data

(63) Continuation of application No. 13/273,422, filed on Oct. 14, 2011.

(30) Foreign Application Priority Data

Oct. 14, 2011   (GB) .................................. 1117740.9

(51) Int. Cl.
    *G06F 12/00*     (2006.01)
(52) U.S. Cl.
    USPC ........... 711/149; 711/135; 711/147; 711/154; 711/202
(58) Field of Classification Search
    USPC ........................ 711/135, 147, 149, 154, 202
    See application file for complete search history.

(56) References Cited

U.S. PATENT DOCUMENTS

| | | | |
|---|---|---|---|
| 5,761,728 A | 6/1998 | Saito et al. | |
| 5,802,587 A * | 9/1998 | Ishikawa et al. | 711/155 |
| 6,000,019 A | 12/1999 | Dykstal et al. | |
| 6,097,664 A * | 8/2000 | Nguyen et al. | 365/230.05 |
| 6,118,724 A | 9/2000 | Higginbottom | |
| 6,169,703 B1 * | 1/2001 | Jennings | 365/233.1 |
| 6,434,674 B1 | 8/2002 | DeWilde et al. | |
| 6,931,019 B2 * | 8/2005 | King et al. | 370/412 |
| 7,343,457 B1 | 3/2008 | End, III | |
| 2010/0198936 A1 | 8/2010 | Burchard et al. | |

FOREIGN PATENT DOCUMENTS

EP     1069512 A2     1/2001

OTHER PUBLICATIONS

Burchard, A., et al., "A Real-time Streaming Memory Controller", Proceedings of the Design, Automation and Test in Europe Conference and Exhibition (DATE'05) Computer Society (6 pgs.).
Meeuwsen, M.J., et al., "A Shared Memory Module for Asynchronous Arrays of Processors", Hindawi Publishing Corporation, EURASIP Journal on Embedded Systems, vol. 2007, Article ID86273, Mar. 1, 2007 (14 pgs.).
Combined Search and Examination Report under Sections 17 and 18(3) for UK Application No. GB1117740.9 dated Feb. 9, 2012 (7 pages).

\* cited by examiner

*Primary Examiner* — Reginald Bragdon
*Assistant Examiner* — Mehdi Namazi
(74) *Attorney, Agent, or Firm* — Lucas & Mercanti LLP; Robert P. Michal

(57) ABSTRACT

A memory controller that allows shared access to a memory device via a plurality of write ports and read ports. A write port includes a data buffer that allows data to be written to a first number of its storage locations at a pre-determined time. A write arbiter is able to read data from a second number of storage locations of a data buffer of a write port at a pre-determined time and write the read data to a memory device. A read port is configured to respond to requests to read data and includes a data buffer. A read arbiter is able to read, at a pre-determined time, data from the memory device on behalf of one of the read ports, and to write the read data into a second number of storage locations of the data buffer of the read port on whose behalf the data was read.

24 Claims, 12 Drawing Sheets

MEMORY CONTROLLER AND METHODS

CROSS REFERENCE TO RELATED APPLICATION

This is a Continuation of U.S. patent application Ser. No. 13/273,422, filed on Oct. 14, 2011, and claims the benefit under application claims benefit under 35 U.S.C. §119 of British Patent Application No. 1117740.9, filed on Oct. 14, 2011, the entire content of which is incorporated hereby by reference.

TECHNICAL FIELD

The present invention relates to a memory controller and methods for providing shared access to a memory device.

BACKGROUND

Computing devices, including for example multi-core processors, application-specific integrated circuits (ASICs) and field-programmable gate arrays (FPGAs), may often incorporate several processes or subsystems that each require access to random access memory (RAM).

These processes or subsystems may be part of a system (e.g. a system-on-a-chip (SoC)) that provides a particular set of functions, or may each provide a different function. For example the device may be an ASIC that includes a different subsystem for each of three modems for a wireless device, such as a GSM (Global System for Mobile Communications) modem, a 3G (3rd Generation radio telecommunication network) modem and an LTE (Long Term Evolution) modem. Each of these subsystems may require RAM access, though in some cases only a subset of the subsystems (e.g. only one modem) may be in use at any particular time. As used herein, "wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices.

One approach to providing each subsystem with RAM access is to provide a different RAM device for each subsystem and to provide each subsystem with a memory controller that enables the subsystem to use its corresponding RAM device. This approach has an advantage in terms of the relative simplicity and flexibility of each memory controller and the relatively small number of constraints (e.g. timing and bandwidth constraints) each memory controller enforces on the subsystem that uses it. However providing a separate RAM device for each subsystem is costly and each RAM device will occupy valuable space and/or silicon area. Additionally each memory controller will consume significant silicon area within each subsystem. In cases where only a subset of the subsystems may be in use at a time, this approach can therefore be wasteful.

Another approach to providing each subsystem with RAM access is to share a RAM device between two or more of the subsystems. In this case a memory controller is shared between the subsystems so that they can use the shared RAM device. This approach has an advantage in terms of lower cost, space and silicon area. However, the complexity of the memory controller is increased, for example it may enforce a number of constraints, such as timing and bandwidth constraints on the subsystems that use it. Where more than one of the subsystems needs to access the RAM at the same time, timing issues can become particularly problematic as the otherwise parallel operations of the subsystems must be interleaved with respect to each other in order to allow shared access to the shared RAM. This can mean that this approach requires a memory controller that is difficult to design, and/or that complex additional logic may be needed within each subsystem so that it can handle the shared memory accesses.

In a device where only a subset of the subsystems are typically in use at any one time, it should be noted that there may still be times when two different subsets of subsystems are active, e.g. one subset may be transitioning to an inactive state whilst another subset is transitioning to an active state. For example a device could comprise multiple modems with typically only one modem in use at a time, but several modems may be in use when switching between modems, e.g. a 3G modem transitioning to an inactive state whilst an LTE modem transitions to an active state. In another example, the subsets of subsystems that are in an "inactive" state may still require occasional access to a small amount of RAM, whereas when those subsystems are in an active state, they may require frequent access to a large amount of RAM.

Sharing a RAM between such subsystems is difficult because there are times when several subsystems require access to the RAM, and therefore timing issues may become problematic as discussed above.

SUMMARY

In accordance with one described example, there is provided a memory controller providing a plurality of write ports that allow shared access to at least one memory device, the memory controller comprising:

a plurality of write ports, at least one of the write ports having a clock frequency and comprising:
  a data buffer having a plurality of storage locations, wherein said data buffer is configured to allow data of a first bit width to be written to at least a first number of its storage locations at a pre-determined time;
  an address buffer having a plurality of address locations, the address buffer being configured to allow addresses to be written to a first number of its address locations; and
  an address translator configured to translate an address associated with data written to a storage location in the data buffer from an address space of the write port to an address space of at least one memory device, such that an address contained in a given address location in the address buffer relates to a memory address of at least one memory device to which data held in a corresponding storage location of the data buffer of the write port is to be written,
wherein the write port is configured to determine if a plurality of translated addresses stored in the address buffer relate to a common memory address of the at least one memory device;

an arbiter having a clock frequency and configured to, responsive to a determination that a plurality of translated addresses stored in an address buffer relate to a common memory address of at least one memory device, read data of a second bit width, the second bit width being greater than the first bit width, from a second number of storage locations of a data buffer associated with said plurality of translated addresses at a pre-determined time and write the data that is read to said at least one memory device.

In accordance with a further described example there is provided a memory controller providing a plurality of read ports that allow shared access to at least one memory device, the memory controller comprising:

a plurality of read ports, at least one of the read ports having a clock frequency and comprising:

a data buffer having a plurality of storage locations capable of containing data of a first bit width read from at least one memory device;

an address translator configured to translate an address associated with a request to read data from a storage location in the data buffer from an address space of the read port to an address space of at least one memory device;

an address buffer capable of storing at least one memory address that relates to at least one memory address of the at least one memory device from which data in one or more of the storage locations of the data buffer was read; and wherein said read port is configured to respond to a request to read data in the data buffer by reading the data from a first number of said storage locations, the read port is configured to determine if a received request to read data is for data in the read port's data buffer on the basis of a relationship between the at least one address included in the request and the at least one memory address in the read port's address buffer, and the read port is configured to, when said data is determined to be in said data buffer, respond to a request to read data by reading the data from a first number of said storage locations, and when said data is determined to not be in said data buffer, respond to a request to read data by reading the data from a first number of said storage locations once the data has been read from the at least one memory device; and an arbiter having a clock frequency and configured to, responsive to a determination that a received request to read data is for data that is not in the read port's data buffer, be able to read at a pre-determined time, data of a second bit width from the at least one memory device on behalf of one of the read ports, the second bit width being greater than the first bit width, and to write the read data into a second number of storage locations of the data buffer of the read port on whose behalf the data was read.

In accordance with another described example, there is provided a method for providing shared access to at least one memory device via a plurality of write ports, the method comprising:

receiving, at one of a plurality of write ports, said write port having a clock frequency and comprising a data buffer having a plurality of storage locations, data of a first bit width and writing the received data to at least a first number of storage locations in the data buffer at a pre-determined time;

receiving, at an address buffer, one or more addresses to be written to a first number of address locations in the address buffer;

translating, at an address translator, said one or more addresses address associated with data written to said first number of storage locations in the data buffer from an address space of the write port to an address space of at least one memory device, such that an address contained in a given address location in the address buffer relates to a memory address of at least one memory device to which data held in a corresponding storage location of the data buffer of the write port is to be written;

determining if a plurality of translated addresses stored in the address buffer relate to a common memory address of the at least one memory device; and responsive to a determination that a plurality of translated addresses stored in an address buffer relate to a common memory address of at least one memory device, reading, at an arbiter having a clock frequency, data of a second bit width from a second number of storage locations of a data buffer associated with said plurality of translated addresses at a pre-determined time and writing the data that is read to said at least one memory device, the second bit width being greater than the first bit width.

In accordance with another described example, there is provided a method for providing shared access to at least one memory device via a plurality of read ports, the method comprising:

responding, at one of a plurality of read ports, said read port having a clock frequency and comprising a data buffer having a plurality of storage locations capable of containing data read from at least one memory device, to a request to read data of a first bit width, said request having an associated address relating to an address space of the read port, by:

translating said address from the request from an address relating to an address space of the read port to an address space of at least one memory device;

storing said translated address in an address buffer;

determining if the received request to read data is for data in the read port's data buffer on the basis of a relationship between the at least one address included in the request and at least one translated address stored in the read port's address buffer; when it is determined that said data is in said data buffer, reading the data from a first number of said storage locations, and when it is determined that said data is not in said data buffer, reading the data from a first number of said storage locations once the data has been read from the at least one memory device; and when said data is not in said data buffer, reading, at an arbiter having a clock frequency, data of a second bit width from the at least one memory device on behalf of one of the read ports at a pre-determined time, the second bit width being greater than the first bit width, and writing the read data into a second number of storage locations of the data buffer of the read port on whose behalf the data was read.

Further features and advantages of the invention will become apparent from the following description, given by way of example only, which is made with reference to the accompanying drawings.

DETAILED DESCRIPTION

Figure 1:
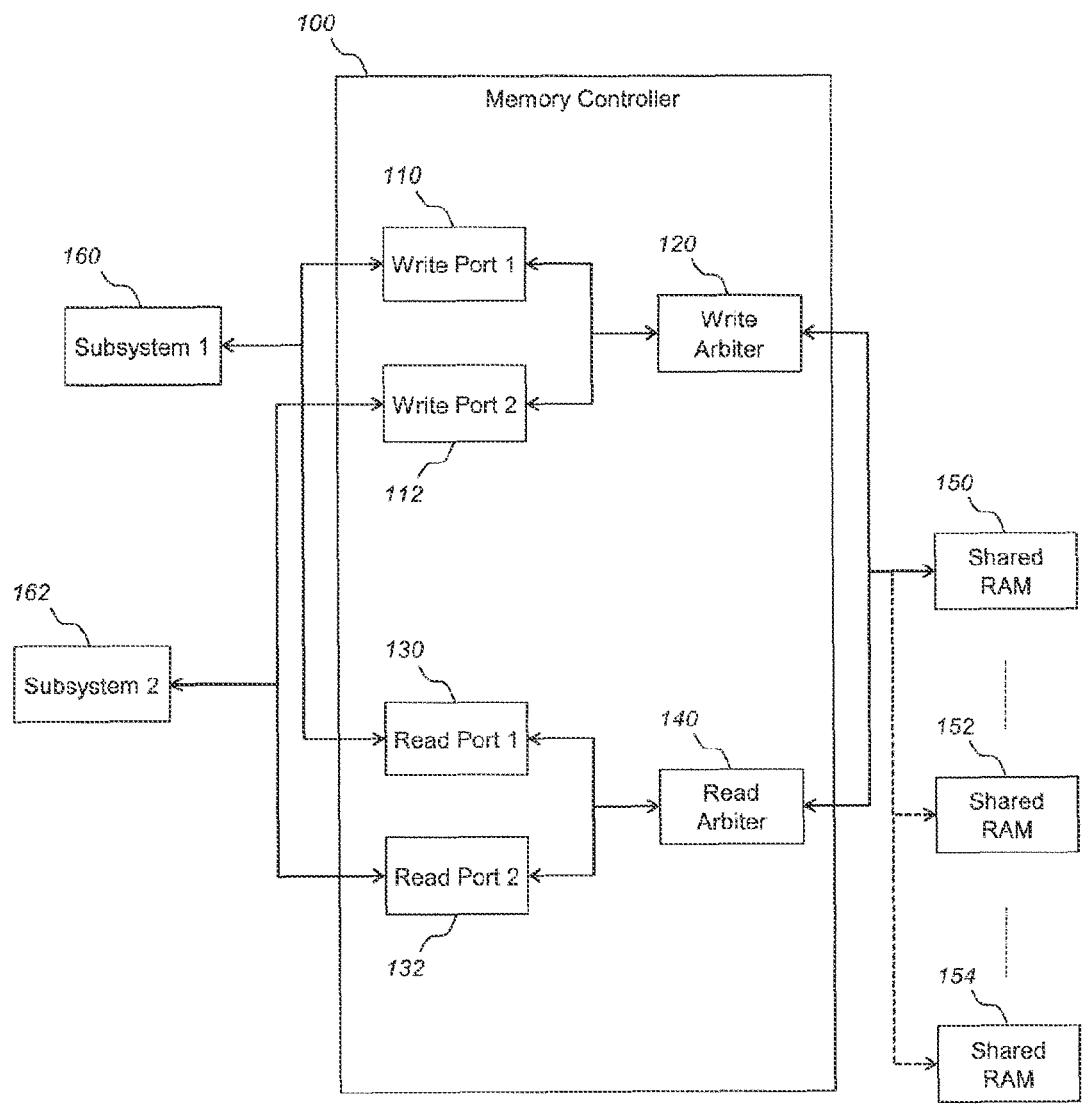
FIG. 1 illustrates schematically an exemplary memory controller, according to various embodiments.

Certain examples present a memory controller providing a plurality of write ports that allow shared access to at least one memory device, the memory controller comprising a plurality of write ports, at least one of the write ports having a clock frequency and comprising a data buffer having a plurality of storage locations, wherein said data buffer is configured to allow data of a first bit width to be written to at least a first number of its storage locations at a pre-determined time, an address buffer having a plurality of address locations, the address buffer being configured to allow addresses to be written to a first number of its address locations and an address translator configured to translate an address associated with data written to a storage location in the data buffer from an address space of the write port to an address space of at least one memory device, such that an address contained in a given address location in the address buffer relates to a memory address of at least one memory device to which data held in a corresponding storage location of the data buffer of the write port is to be written, wherein the write port is configured to determine if a plurality of translated addresses stored in the address buffer relate to a common memory address of the at least one memory device. The memory controller also comprises an arbiter having a clock frequency and configured to, responsive to a determination that a plurality of translated addresses stored in an address buffer relate to a common memory address of at least one memory device, read data of a second bit width, the second bit width being greater than the first bit width, from a second number of storage locations of a data buffer associated with said plurality of translated addresses at a pre-determined time and write the data that is read to said at least one memory device.

By the write arbiter writing data from a second number of storage locations (of a data buffer of a write port) to the memory device at a pre-determined time whilst a given write port allows a first number of its data buffer's storage locations to be written at a pre-determined time, the memory controller can provide that the bandwidth of data read from a write port and written to the memory device by the write arbiter is greater than or equal to the bandwidth of the data written to the write port.

In an example, said data buffer is configured to allow data to be written to a first number of its storage locations during every clock cycle of the write port, and said arbiter is configured to be able to read said data during every clock cycle of the arbiter, and the second number of storage locations read by the arbiter, the clock frequency of the arbiter, the first number of storage locations written to said write ports and the clock frequency of said write port providing that the bandwidth of data read from said write port by the arbiter is greater than or equal to the bandwidth of data written to said write port. Writing and reading during every respective clock cycle of the write port and arbiter leads to the most efficient transfer of data. Nevertheless, other arrangements are possible, such as writing and/or reading during every second clock cycles, every third clock cycle, etc., etc.

The memory controller can thus allow data to be written into the write port during each clock cycle of the write port. This can be done without the write port restricting i.e. gating any of the writes made into it in order to time writes into the memory device with respect to writes made by other write ports, or in order to prevent the write port's data buffer from overflowing. Preferably, the bandwidth of data written to the memory device by the write arbiter will be greater than or equal to the bandwidth of all the data written into the write ports. This is of particular benefit in a wireless device as it allows data to be written to the memory with low latency and practically at will.

Each write port includes an address buffer having a plurality of address locations, and the address buffer is configured to allow addresses to be written to a first number of its address locations, where an address contained in a given address location in the address buffer relates to a memory address of the memory device to which data held in a corresponding storage location of the data buffer of the write port is to be written. The address buffer of a write port enables a subsystem writing to the write port to provide an address along with each write to the write port. Each address relates to a memory address of the memory device to which the data written to the write port with that address should be written.

A write port may provide its own address space to the subsystem that writes to the write port. An address provided to the write port may be translated by an address translator of the write port in order to obtain a memory address of the memory device.

In some examples the second number of storage locations read by the arbiter are storage locations having addresses in said address buffer that relate to a first memory address in the memory device. Thus data from the second number of storage locations that are read in a given clock cycle by the read arbiter may be written to one address (i.e. the first memory device) of the memory device. In particular, data written to sequential addresses of a write port may be written to a single address of the memory device, e.g. 4 data D1-D4, each of 16 bit width, may be written to the memory device at a first memory address that holds 64 bit data.

In some examples the memory controller is configured to write update data to one or more update storage locations of the data buffers of one or more write ports in response to the update data being written to one or more storage locations of the data buffer of a first write port, on the basis of a relationship between the corresponding addresses of the one or more update storage locations and the corresponding addresses of the one or more storage locations of the first write port in which the update data is written. In this way the memory controller is able to maintain coherency between data written to the data buffers of different write ports. If, for example, data D1 is written to address A1 in a first write port on clock cycle 1, and data D2 is written to address A1 in a second write port on clock cycle 2, the memory controller updates the data buffers of both write ports with data D2 in order to maintain coherency between the write ports.

In some examples the clock frequency of the write arbiter is substantially equal to the clock frequency of each write port, and the second number of storage locations read by the arbiter and the first number of storage locations written to by each write port provide that the bandwidth of data read from the write ports by the arbiter is greater than or equal to the bandwidth of data written to the write ports. Thus, where the clock frequency of the write arbiter is substantially equal to the clock frequency of the write ports, the bandwidth of data read from the write ports by the arbiter may be made greater than or equal to the bandwidth of data written to the write ports by selecting appropriate values for the second number of storage locations read by the arbiter and the first number of storage locations written to by each write port. For example, the second number of storage locations may be selected to be greater than or equal to the first number of storage locations.

In some examples each write port is configured to allow the arbiter to read data from storage locations in the data buffer of the write port in response to receiving a flush signal. In these examples the flush signal may for example be generated when the data buffer of a write port is full, or when data is written to the write port at a translated address that is not equal to the address currently stored in the address buffer of the write port. The flush signal may indicate that data in the data buffer of the write port is to be flushed to a write buffer of the write port from which it may be read by the write arbiter, or in an alternative arrangement the write arbiter may read the flushed data from the data buffer of the write port.

In some examples the arbiter includes a scheduler configured to select a different one of the write ports during different clock cycles of the arbiter, and the arbiter is configured to read said data from a second number of storage locations of the data buffer of the write port selected by the scheduler. The scheduler may assign a priority ordering to the write ports, such that during each clock cycle, the data flushed from a different write port has priority over the data flushed from other write ports. The scheduler may for example assign a different priority to each write port in each clock cycle of the write arbiter such that the write port with highest priority changes according to a round robin schedule.

Certain examples present a memory controller providing a plurality of read ports that allow shared access to at least one memory device, the memory controller comprising a plurality of read ports, at least one of the read ports having a clock frequency and comprising a data buffer having a plurality of storage locations capable of containing data of a first bit width read from at least one memory device, an address translator configured to translate an address associated with a request to read data from a storage location in the data buffer from an address space of the read port to an address space of at least one memory device, and an address buffer capable of storing at least one memory address that relates to at least one memory address of the at least one memory device from which data in one or more of the storage locations of the data buffer was read, wherein said read port is configured to respond to a request to read data in the data buffer by reading the data from a first number of said storage locations, the read port is configured to determine if a received request to read data is for data in the read port's data buffer on the basis of a relationship between the at least one address included in the request and the at least one memory address in the read port's address buffer, and the read port is configured to, when said data is determined to be in said data buffer, respond to a request to read data by reading the data from a first number of said storage locations, and when said data is determined to not be in said data buffer, respond to a request to read data by reading the data from a first number of said storage locations once the data has been read from the at least one memory device. The memory controller also comprises an arbiter having a clock frequency and configured to, responsive to a determination that a received request to read data is for data that is not in the read port's data buffer, be able to read at a pre-determined time, data of a second bit width from the at least one memory device on behalf of one of the read ports, the second bit width being greater than the first bit width, and to write the read data into a second number of storage locations of the data buffer of the read port on whose behalf the data was read.

By the read arbiter reading data from a memory device and writing that data (read from the memory device) to a second number of storage locations of the data buffer of a read port at a pre-determined time whilst a given read port allows data to be read from a first number of its storage locations, the memory controller can provide that the bandwidth of data written to a read port by the read arbiter is greater than or equal to the bandwidth of the data read from the read port. This is of particular benefit in a wireless device as it allows data to be read from the memory with low latency and practically at will.

In an example, the arbiter is configured to be able to read, during every clock cycle of the arbiter, said data from the memory device on behalf of one of the read ports, and to write the read data into a second number of storage locations of the data buffer of the read port on whose behalf the data was read, the second number of storage locations written to by the arbiter, the clock frequency of the arbiter, the first number of storage locations read by said read port and the clock frequency of that read port providing that the bandwidth of data written to the read port by the arbiter is greater than or equal to the bandwidth of data read from the read port.

The memory controller can thus allow a subsystem to read data from the read port during each clock cycle of the read port. When data for a requested address is not in the read port however a delay occurs between the read request being made and the data being made available, due to the delay of reading from the memory device. Preferably, the bandwidth of data read from the memory device by the read arbiter will be greater than or equal to the bandwidth of all the data read from the read ports.

Each request to read data includes at least one address, the at least one address relating to a memory address of the memory device, and wherein each read port includes:

an address buffer capable of storing at least one memory address that relates to at least one memory address of the memory device from which data in one or more of the storage locations of the data buffer was read, wherein at least one of the read ports is configured to:

determine if a received request to read data is for data in the read port's data buffer on the basis of a relationship between the at least one address included in the request and the at least one memory address in the read port's address buffer.

Thus each read request may specify the address of the data that is to be read. In order to enable the memory controller to determine whether the requested data is held in the read port's data buffer an address buffer containing the addresses of data stored in the data buffer is provided for a read port and is used to compare a received address against those in the address buffer.

A read port may provide its own address space to the subsystem that reads from the read port. An address provided to the read port may be translated by an address translator of the read port in order to obtain a memory address of the memory device.

In some examples, in response to a read port determining that a request to read data is for data not in that read port's data buffer, the arbiter is configured to read data from the memory device on behalf of the read port and to write the read data into the data buffer of that read port. Thus the read arbiter reads data from the memory device in order to satisfy read requests for data not currently held in the read ports.

In some examples, in response to a read port determining that a read request is for data not in that read port's data buffer, the arbiter is configured to read pre-fetch data, different from the data requested in said read request, from said memory device on behalf of the read port and to write the pre-fetch data into the data buffer of that read port. In this way the read arbiter may pre-emptively read data from the memory device for a given read port, in order to reduce the delay in processing later requests made to the read port for the pre-fetched data.

In some examples the memory controller is configured to, in response to a first read port determining that a received request to read data is for data not in the data buffer of the first read port, determine whether the data is in the data buffer of one or more other read ports, and if it is, is configured to allow the first read port to respond to said request by reading the data from a first number of storage locations in the data buffer of said other read ports.

In this way, in response to a first read port determining that a received read request is for data not in the data buffer of the first read port, the memory controller may determine whether the data is in the data buffer of the other read ports. If the requested data is in the data buffer of one of the other read ports the first read port can respond to the read request by reading the data from the data buffer of that other read port, rather than by reading the data from the memory device.

In some examples the clock frequency of the arbiter is substantially equal to the clock frequency of each read port, and the second number of storage locations written to by the arbiter and the first number of storage locations read by each read port provide that the bandwidth of data written to the read ports by the arbiter is greater than or equal to the bandwidth of data read from the read ports. Thus, where the clock frequency of the read arbiter is substantially equal to the clock frequency of the read ports, the bandwidth of data written to the read ports by the read arbiter may be made greater than or equal to the bandwidth of data read from the read ports by selecting appropriate values for the second number of storage locations written to by the arbiter and the first number of storage locations read from each read port. For example, the second number of storage locations may be selected to be greater than or equal to the first number of storage locations.

In accordance with another described example, there is provided a memory controller providing a plurality of write ports that allow shared access to a memory device, as described above, and comprising a plurality of read ports that allow shared access to a memory device, as described above. Thus examples of the invention include a memory controller having both a plurality of write ports and a write arbiter and a plurality of read ports and a read arbiter.

In some examples the memory controller is configured to write update data to one or more update storage locations of the data buffers of one or more read ports in response to said update data being written to one or more storage locations of the data buffer of a first write port, on the basis of a relationship between corresponding memory addresses of the one or more update storage locations and corresponding memory addresses of the one or more storage locations of the first write port in which said update data is written. In this way the memory controller is able to maintain coherency between data written to the data buffers of write ports and stored in the data buffers of read ports. If, for example, data D1 is written to address A1 in a write port on clock cycle 1, and data D2 is read from to address A1 in a read port on clock cycle 2, the memory controller updates the data buffers of both the write port and read port in clock cycle 2 with data D2 in order to maintain coherency between the write port and the read port.

FIG. 1 illustrates an exemplary memory controller 100 according to various embodiments. A first subsystem 160 and a second subsystem 162 may be connected to the memory controller 100 in order to access a shared RAM 150 (which may be a single RAM 150 or plural RAMs 150-154, as is later described). The memory controller 100 comprises two write ports 110 and 112 and two read ports 130 and 132. In the example system of FIG. 1, the first subsystem 160 is connected to the first write port 110 and to the first read port 130, whilst the second subsystem 162 is connected to the second write port 112 and the second read port 132.

Each write port 110-112 of the memory controller 100 allows data to be written to the shared RAM 150. A write arbiter 120 is provided to enable writes into the write ports 110-112 to share the shared RAM 150. In various embodiments, the shared RAM 150 provides a write port which is used by the write arbiter 120 in order to write to the shared RAM 150 (i.e. the RAM 150 is a dual port RAM).

Each read port 110-112 of the memory controller 100 allows data to be read from the shared RAM 150. A read arbiter 140 is provided to enable reads from the read ports 120-122 to share the shared RAM 150. In various embodiments the shared RAM 150 provides a read port which is used by the read arbiter 140 in order to read from the shared RAM 150.

Thus embodiments provide a memory controller that can provide shared access to a memory device such as a RAM. A number of subsystems may share the RAM via the memory controller. Each subsystem may use one or more ports in order to access the shared RAM, and each port may typically be used by one subsystem.

In various embodiments the memory controller 100 and the subsystems 160-162 may be implemented on the same device, e.g. the same multi-core processor, ASIC or FPGA.

The subsystems 160-162 may each provide a different function of the device, e.g. one may be a 3G modem and the other may be an LTE modem. Each subsystem may thus operate in parallel and may require independent access to RAM.

In general, in order to provide a memory controller that provides a write interface to the shared RAM that is straightforward to use via each write port, embodiments provide that the bandwidth of data written to the shared memory is greater than or equal to the bandwidth of data written to a write port. Preferably the bandwidth of data written to the shared memory will be greater than or equal to the sum of the bandwidth of data written to all of the write ports.

Similarly, in order to provide a memory controller that provides a read interface to the shared RAM that is straightforward to use via each read port, embodiments provide that the bandwidth of data read from the shared memory is greater than or equal to the bandwidth of data read from a read port. Preferably the bandwidth of data read from the shared memory will be greater than or equal to the sum of the bandwidth of data read from all of the read ports.

As will be described in greater detail below, the memory controller is able to provide the maximum bandwidth to data written into/read from a given write/read port when data is written into/read from the write/read port sequentially (i.e. to sequential addresses). Writes/reads to "random" addresses may not be written to/read from the shared RAM with as high a bandwidth as writes/reads to sequential addresses.

Figure 2:
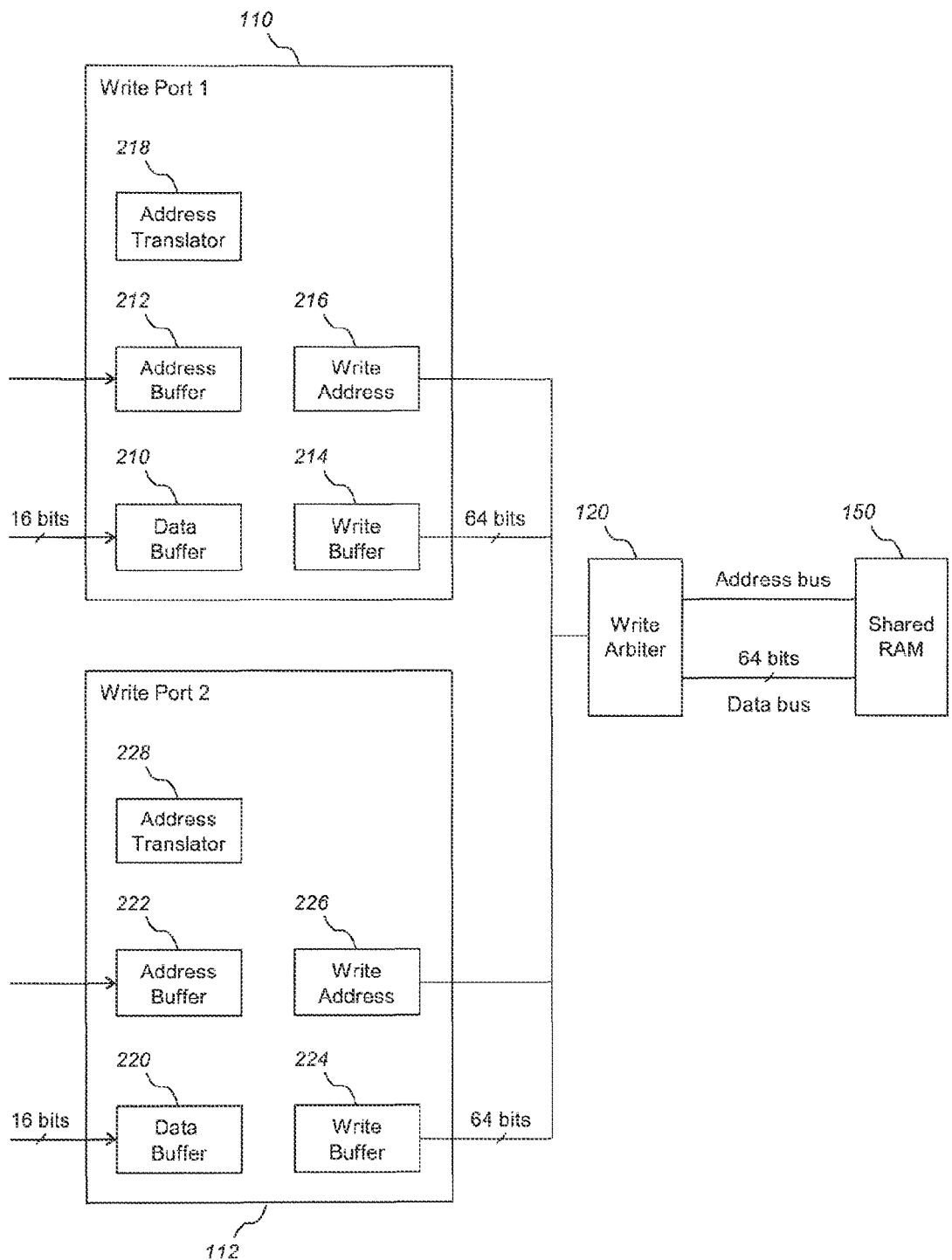
FIG. 2 illustrates schematically in further detail a write portion of the exemplary memory controller of FIG. 1, according to various embodiments.

The write ports 110-112 and write arbiter 120 of a first example of an embodiment of the memory controller 100 will now be described in detail with reference to the portion of the memory controller of FIG. 1 that is shown in FIG. 2.

As shown in FIG. 2, each write port 110-112 of the memory controller 100 includes a data buffer 210, 220, an address buffer 212, 222, a write buffer 214, 224, a write address buffer 216, 226, and an address translator 218, 228. The general operation of these components will now be summarised in terms of one of the write ports 110 before the operation of a write port is explained in further detail.

The data buffer 210 of write port 110 includes a plurality of storage locations within which data may be stored. Each storage location in the data buffer 210 may include storage for a fixed amount of data, e.g. 16 bits. The address buffer 212 of write port 110 includes locations for storing one or more addresses associated with data written into the write port. The write port 110 may have an associated address space, and the address translator 218 of write port 110 serves to translate between the address space of the write port 110 (e.g. as used in addresses received by the write port 110 from subsystem 160) and the address space of the shared RAM 150. Once data in the data buffer 210 is ready to be written by the write arbiter 120 to the shared RAM 150, that data may be flushed from the data buffer 210 of the write port 110, along with corresponding addresses stored in the address buffer 212. The write arbiter 120 may then write the data held in the write buffer to the shared RAM 150, as is later explained in further detail.

Figure 3:
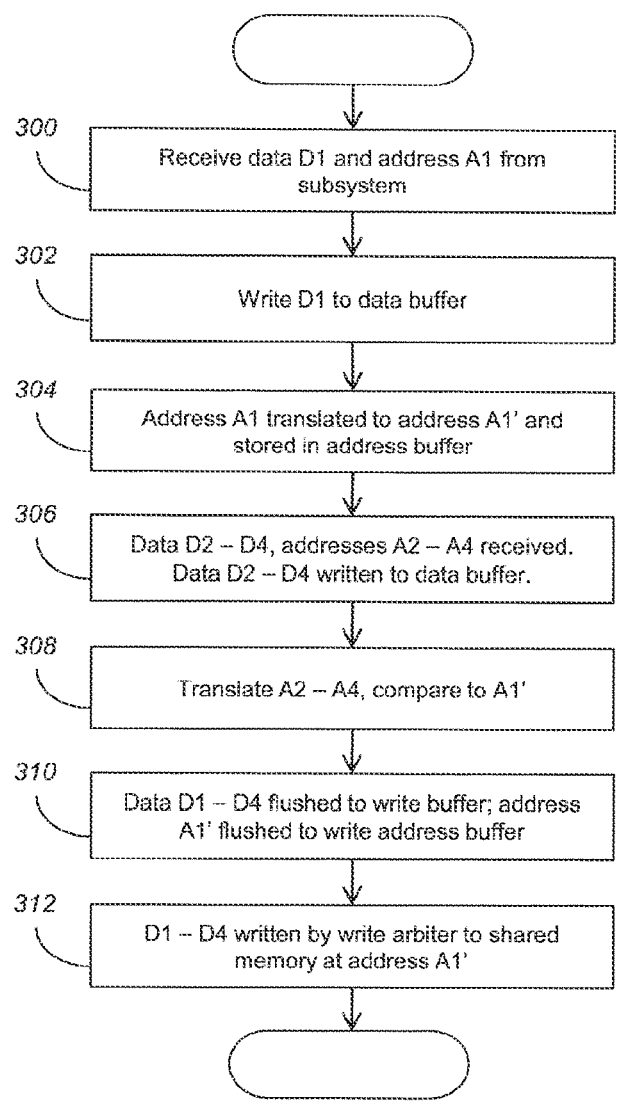
FIG. 3 illustrates schematically a block diagram indicating an example of steps performed in writing into a write port of the memory controller of FIG. 1, according to various embodiments.

Examples of the steps involved in writing into a write port 110 four exemplary data, D1, D2, D3 and D4 to sequential addresses A1, A2, A3 and A4, respectively, and for that data to be prepared for writing to the shared RAM 150, will, now be described in detail, with reference to FIG. 3. Each data D1-D4 received by the write port 110 may for example be 16 bits wide, and the data buffer of the write port may contain four storage locations, i.e. one for each of data D1-D4. It should be noted that the components of the write port may typically perform one or more of the following steps in parallel, as will be clear to those skilled in the art.

Initially the write port 110 receives data D1 from subsystem 160 (step 300). The write port receives address A1 with data D1, indicating that D1 is to be written to address A1 of the write port's address space.

Received data D1 is written to one of the storage locations of the data buffer 210 of the write port 110 (step 302).

Address translator 218 translates received address A1 from the address space of the write port 110 into the address space of the shared RAM 150, i.e. into address A1', and translated address A1' is then stored in one of the address locations of the address buffer 212 of the write port 110 (step 304).

The address space of the write port 110 may provide addresses for data of a first bit width, e.g. 16 bit wide data. The address space of the write port 110 may begin at address 0 and end at address N−1, thus representing a total of 16N bits of data.

The address space of the shared memory 150 may provide addresses for data of a second bit width, e.g. 64 bit wide data, and the address space of the shared memory 150 may begin at address 0 and end at address M−1, thus representing a total of 64M bits of data.

Data in the address space of the write port 110 may thus be stored in a subset of the address space of the shared RAM 150. In this example, four 16 bit data in the address space of the write port 110 may be stored in one 64 bit wide data in the address space of the shared RAM 150. Thus to translate from the address space of the write port 110 to the address space of the shared RAM 150, the address translator 218 may divide received address A1 by four (which may be accomplished by a bit shift), and/or add a fixed number to the result (or to A1), where the fixed number represents the start address of the write port's 110 address space within the shared RAM's 150 address space.

In this embodiment, the address buffer 212 includes one address location which relates to an address in the shared RAM 150 in which data in four storage locations in the data buffer 210 will be stored, once the data in the data buffer 210 has been flushed, as is later described in further detail.

The write port 110 receives data D2, D3 and D4, along with addresses A2, A3 and A4 from subsystem 160 (step 306). Each data D2-D4 may be received in a different clock cycle of the write port 110 as will later be illustrated.

Received data D2-D4 are each written to a different one of the storage locations in the data buffer 210 of the write port 110.

As each address A2-A4 is received, it is translated by the address translator 218 into addresses A2'-A4', respectively (step 308). Each translated address A2'-A4' is compared for equality to address A1' stored in the address buffer 212. In the exemplary memory controller depicted in this embodiment, four 16 bit data in the written to the write port 110 may be stored in one 64 bit data of the shared RAM 150, and so the translated addresses A1'-A4' may relate to the same address in the shared RAM 150, and therefore A2'-A4' may be equal to A1'. The write port 110 may thus determine that data D1-D4 may be stored within the shared RAM 150 at address A1' (which contains 64 bits of data).

As an example, address A1 is address 16 of the write port, A2 is address 17, A3 is 18, A4 is 19. As each address in the address space of the shared RAM 150 contains 4 data, A1 to A4 may each be translated to addresses A1'-A4' by dividing each address by 4 and rounding down, thus each of A1'-A4' is address 4.

Once D4 has been written to the data buffer 210, the write port 110 may determine that the data buffer 210 is full (i.e. each of its four storage locations contains one of data D1-D4). In response, write port 110 generates a flush signal and data D1-D4 is flushed from the data buffer 210 to the write buffer 214 (step 310). Additionally address A1' in the address buffer is flushed from address buffer 212 to write address buffer 216. The write buffer 214 may in this embodiment comprise storage for 64 bit wide data, i.e. it has the same data width as four storage locations in the data buffer 210, and one storage location of the shared memory 150. The write address buffer 216 may in this embodiment contain one memory address, e.g. A1', which indicates the memory address of the shared RAM 150 to which data in the write buffer 214 should be written to.

Storage locations in the data buffer 210 that have data flushed to the write buffer 214 may have new data written into them by the subsystem 160. Similarly address locations in the address buffer 212 that have addresses flushed to the write address buffer 216 may have new addresses written into them by the subsystem 160.

Once data D1-D4 are held in the write buffer 214, the write arbiter 120 writes data D1-D4 to the memory address A1' of the shared RAM 150 (step 312). The write arbiter 120 may be configured to write data from one of the write ports 110-112 during every clock cycle of the write arbiter. Each clock cycle the write arbiter 120 may read data from the write buffer of a write port 110-112, and write the data in read from that write buffer to the address indicated by the write address buffer of the write port. The write arbiter 120 may read data from a different write port during each clock cycle of the write port, e.g. according to a schedule such as for example a round robin schedule. The operation of the write arbiter 120 will later be described in further detail.

It should be noted that in this embodiment each write port 110-112 of the memory controller 100 is configured to allow data to be written into it on every clock cycle of the write port. Thus each write port does not provide means for gating (i.e. restricting) writes into the write port. As a result, from the point of view of a subsystem, e.g. 160, a write port e.g. 110 provides a very straightforward interface for writing into the shared RAM 150.

Figure 4:
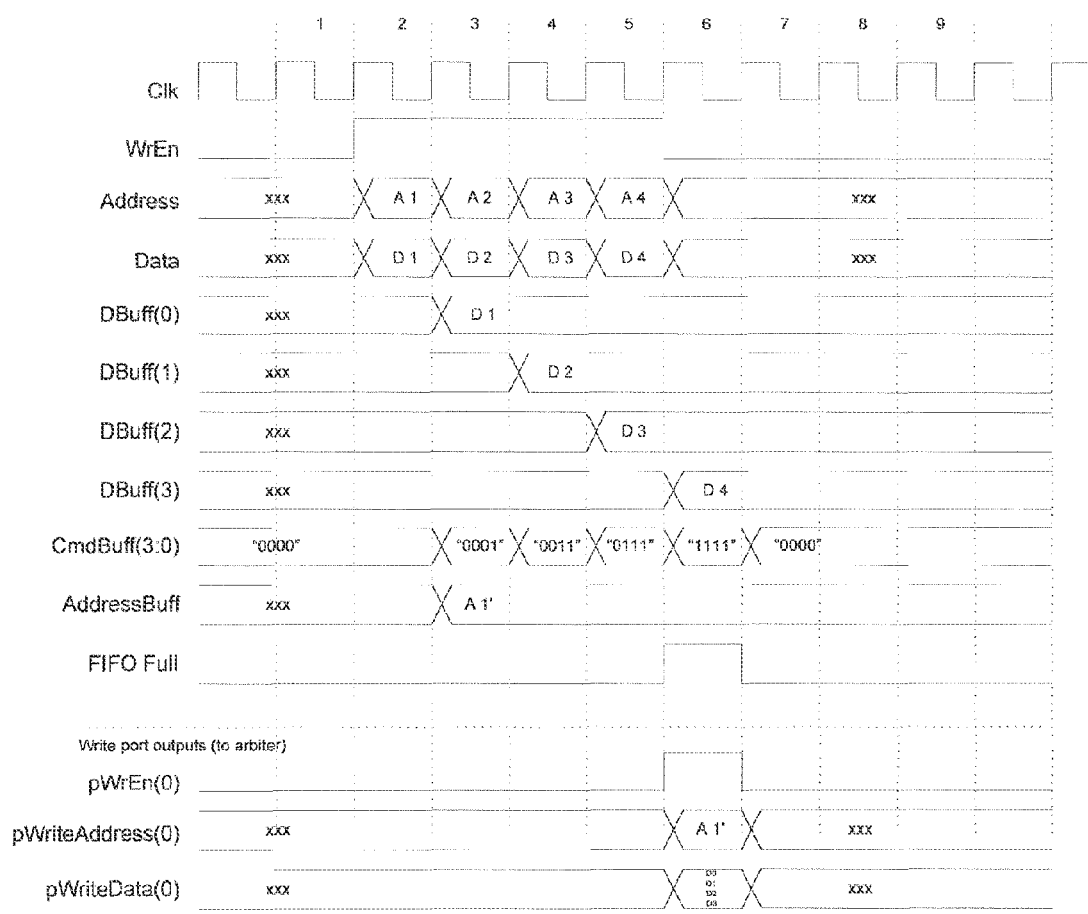
FIG. 4 is a timing diagram illustrating the writing of data to a write port of the memory controller of FIG. 1, according to various embodiments.

FIG. 4 is a timing diagram illustrating the writing of data D1-D4 to the data buffer 210 of write port 110 in greater detail. The clock cycles of the write port are shown by the signal 'Clk', the data signal provided to the write port, e.g. by subsystem 160, during a given clock cycle is shown by the signal 'Data' and the address data provided to the write port, e.g. by subsystem 160, during a given clock cycle is shown by the signal 'Address'.

The write port may also receive from subsystem 160 a write enable signal 'WrEn', which indicates whether data is to be written into the write port during any given clock cycle. Thus in FIG. 4, during clock cycles 2 to 5 the 'WrEn' signal is raised high and data D1-D4 are written, sequentially, into the write port along with addresses A1-A4, respectively. In the other clock cycles shown in FIG. 3, where the 'WrEn' signal is set low, no address or data is written into the write port. As indicated above, in this embodiment each of D1-D4 are 16 bits wide.

Signals DBuff(0)-Dbuff(3) indicate the data stored in storage locations 1 to 4 of the data buffer 210 of the write port, respectively. Thus, in clock cycle 3, after data D1 has been received by the write port in clock cycle 2, i.e. as in step 300 above, D1 is stored in storage location 0 of the data buffer of the write port, as shown by the signal DBuff(0), i.e. step 302. Similarly, in clock cycles 4, 5 and 6, after data D2, D3 and D4 have been written to the write port in clock cycles 3, 4 and 5, respectively, D2, D3 and D4 are stored in storage locations 2 to 4 of the data buffer of the write port, as shown by the signals DBuff(1), DBuff(2) and DBuff(3), respectively, i.e. step 306.

Addresses A1-A4 are also sequentially written into the write port in clock cycles 2-5. In clock cycle 2, address A1 is translated to address A1' and stored in the address buffer, the output of which is shown in signal 'AddressBuff' of FIG. 4, i.e. step 304. In clock cycles 3-5, addresses A2-A4 are received and translated to addresses A2'-A4', each of which is compared to address A1' stored in the address buffer 212, i.e. step 308.

As in this case addresses A1'-A4' are the same address, in this case the write port 110 is able to determine that data D1-D4 should be stored in the same location of the shared RAM 150, i.e. at the address A1'.

A bookkeeping mechanism may be used by the write port 110 to track which storage locations of the data buffer 210 have had data written to them, and thus when the data buffer 210 is full. In the example of FIG. 4, bookkeeping data is stored in a register whose output is the signal 'CmdBuff(3:0)'. The bookkeeping data comprises of one bit of data for each storage location in the data buffer 210, where a given bit is set high if the storage location corresponding to that bit has had data written into it. Thus, for example, in FIG. 4, after data is written into storage location 0 of the data buffer in clock cycle 2, bit 0 of CmdBuff(3:0) is set high in clock cycle 3. Similarly after data is written into storage location 1 of the data buffer in clock cycle 3, bit 1 of CmdBuff(3:0) is set high in clock cycle 4, etc. In clock cycle 6, after data has been written into each storage location of the data buffer, all the bits of CmdBuff(3:0) are raised high, indicating that the data buffer is full. After the buffer is flushed, all the bits of CmdBuff(3:0) are set low in clock cycle 7.

In clock cycle 6 i.e. once data D1-D4 have been written to the data buffer 210 the write port determines that the data buffer 210 is full, and thus the flush signal 'FIFO Full' is raised, i.e. step 310. Additionally data D1-D4 is flushed to the write buffer 214, and address A1' is flushed to the write address buffer 216. In FIG. 4, the output of the write buffer 214 is indicated by the signal 'pWriteData(0)', and the output of the write address buffer 216 is indicated by the signal 'pWriteAddress(0)'. A write enable signal 'pWrEn(0)' is also provided by the write port 110 when the write buffer 214 contains data that is ready to be written to the shared RAM 150 by the write arbiter 120. In FIG. 4, once D1-D4 have been flushed from the data buffer 210, 'pWriteData(0)' outputs D1-D4, 'pWriteAddress(0)' outputs A1', and 'pWrEn(0)' in clock cycle 6. These signals are read by the write arbiter 120 which then writes D1-D4 to address A1' of the shared RAM 150, and clears the write buffer 214 and write address buffer 216, as will later be explained in further detail.

Figure 5:
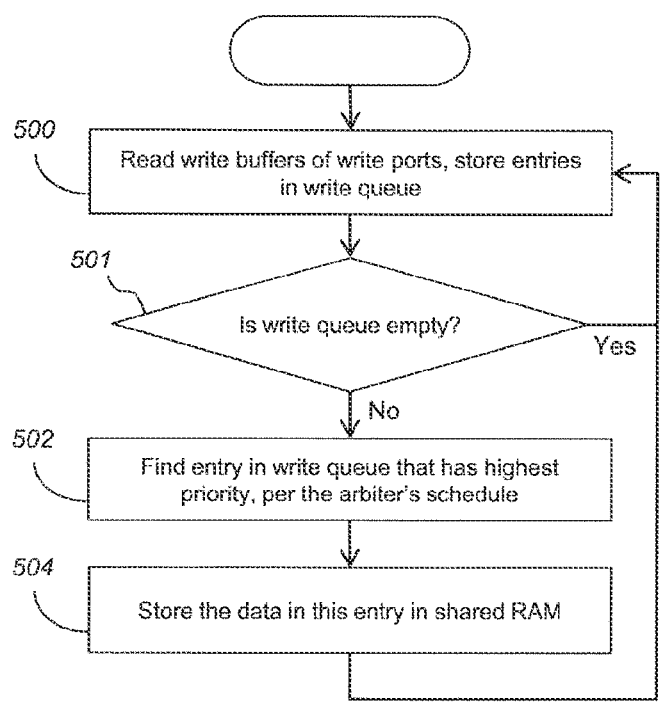
FIG. 5 illustrates schematically a block diagram indicating an example of steps performed in writing data to a shared RAM, according to various embodiments.

Examples of the steps performed by the write arbiter 120 in writing data items from a write port 110-112 to the shared RAM 150 will now be described with reference to the steps of FIG. 5. It should be noted that write arbiter 120 may typically perform one or more of the following steps in parallel, as will be clear to those skilled in the prior art.

Initially the write arbiter 120 reads the write buffers 214, 224 of the write ports 110-112 (step 500).

In this embodiment, in order to enable the write arbiter 120 to efficiently handle simultaneous writes from the write ports 110-112 (e.g. where the write enable signal of a write port is raised by multiple write ports in the same clock cycle), the write arbiter 130 includes a write queue.

Each entry in the write queue contains data to be written to shared RAM 150, an address to use when writing that data, and a port identifier. These are stored in the write queue of the write arbiter 120 so that they can be used when the write arbiter 120 writes to shared RAM 150. When reading the write buffers 214, 224 of the write ports 110-112 as described above the write arbiter 120 stores information that is read from the write ports in the write queue of the write arbiter 130 as is now described.

For each write port 110-112, the write arbiter 120 may determine whether the write enable signal (described above) provided by the write port is raised high. If it is, the write arbiter 120 determines that data in the write buffer of that write port is ready to be written to the shared RAM 150. If that is the case the write arbiter 120 thus reads the data in the write buffer of the write port and stores it in a new entry at the end of its write queue. It also reads the address in the write address buffer of the write port and stores it in this entry along with a port identifier that identifies the port from which the data and address have been read, e.g. if they have been read from port 1, then the value 1 is stored in the entry in the write queue.

Once each of the write ports 110-112 have been read in this way, the write arbiter 120 then checks its write queue to see if it is empty (step 501). If the write queue is empty (e.g. because no new entries were stored in the write queue during the current clock cycle, and because no entries from previous clock cycles are present in the write queue), the write arbiter 120 may not perform a write to the shared RAM 150 during this clock cycle, and may thus return to step 500.

Thus the write arbiter 120 is configured to be able to accept write requests from the write ports 110-112 during every clock cycle (and to perform a write to shared RAM 150 every clock cycle, as is later described). However the write arbiter 120 need not accept write requests every clock cycle, and/or may not perform a write to shared RAM 150 every clock cycle, if an insufficient number of write requests are provided. Typically at least one of the subsystems 160-162 using the write ports 110-112 may write a high bandwidth of data to the shared RAM 150. Thus it can be expected that write requests are typically received every clock cycle, and that writes to shared RAM 150 are performed every clock cycle.

If the write queue is not empty, the write arbiter 120 may proceed by finding an entry in the write queue that has the highest priority, according to a schedule provided by a scheduler of the write arbiter 120 (step 502).

The scheduler of the write arbiter assigns a priority ordering to the write ports, such that during each clock cycle, the data of a different write port has priority over the data of other write ports. The scheduler may for example assign a different priority to each write port in each clock cycle of the write arbiter 120 such that the write port with highest priority changes according to a round robin schedule.

The write arbiter 120 may find the entry in the write queue that has the highest priority by searching through the entries in the write queue of the write arbiter 120 and comparing the port identifiers of the entries to the schedule provided by the scheduler.

If, for example, in a given clock cycle the scheduler indicates that write port 1 has the highest priority in the schedule, then the write arbiter 120 checks whether there are any entries in the write queue having the port identifier of write port 1. If the write arbiter 120 determines that there is no entry in the write queue having the port identifier of write port 1, it then checks whether there are any entries in the write queue having the port identifier of the write port with the next highest priority, etc.

The write arbiter 120 continues in this way until an entry in the write queue is identified. Once such an entry is identified the write arbiter 120 writes the data of that entry to the shared RAM 150 at the address specified by the address of that entry, and removes that entry from the write queue (step 504). The write arbiter then returns to step 500 for the next clock cycle.

The write queue may thus implement a priority queue, where the priorities are provided by the scheduler of the write arbiter 120.

In this way the write arbiter 120 stores in the shared RAM 150 data that was read from the write buffer of a write port. Interfaces for writing data to a RAM device are known in the prior art and may be used by the write arbiter 120 to store the data in the shared RAM 150.

Figure 6:
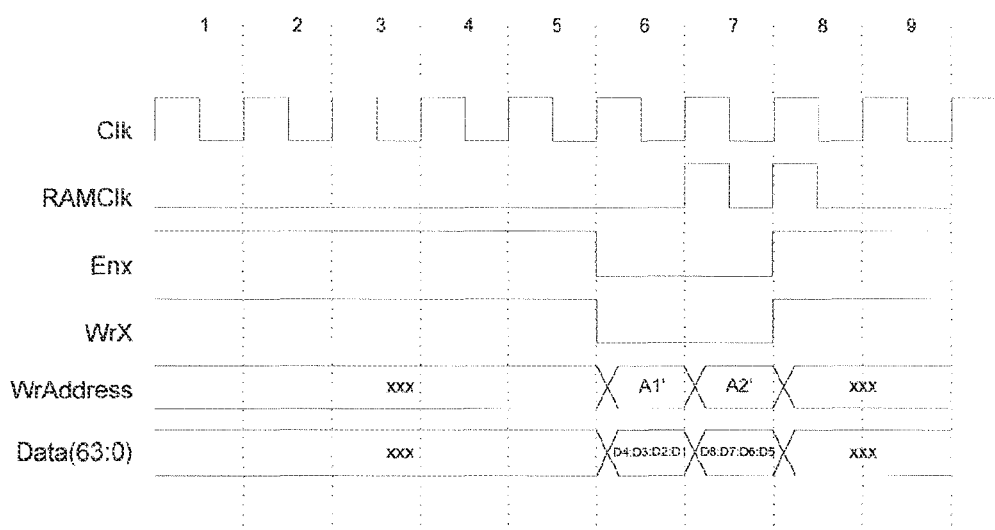
FIG. 6 is a timing diagram illustrating the writing of data to a shared RAM, according to various embodiments.

FIG. 6 is a timing diagram illustrating the signals transmitted to the shared RAM 150 by the write arbiter 120 in order to write data D1-D4 to memory address A1' and data D5-D8 to memory address A2'. Clock cycles of the write arbiter are indicated by the signal 'Clk'. In clock cycle 6, the shared RAM is enabled by lowering the 'EnX' signal and writing of the shared RAM is enabled by lowering of the signal 'WrX'. Additionally data D1-D4 are set up on the data bus and write address A1' is set up on the address bus. The write is performed at the end of clock cycle 6 when the clock signal of the RAM, i.e. the signal 'RAMClk' is raised by the write arbiter. Similarly in clock cycle 7 data D5-D8 are set up on the data bus and write address A2' is set up on the address bus. The write is performed at the end of clock cycle 7 when the clock signal of the RAM, i.e. the signal 'RAMClk' is raised by the write arbiter.

In this embodiment, if in a given clock cycle the write queue of the write arbiter 120 is empty when the write arbiter reads the write buffers of the write ports 110-112 in step 500, the data in the write buffer of the write port having the highest priority according to the scheduler is then stored in shared RAM 150, and any other writes in the write ports 110-112 are stored in the write queue. These other writes are then written to shared RAM from the write queue in subsequent clock cycles.

Thus in this embodiment, the write arbiter 120 is configured to be able to, during each clock cycle of the write arbiter 120, write data from the write buffer of one of write ports 110-112 (or from the write arbiter's write queue) to the shared RAM 150.

Figure 7:
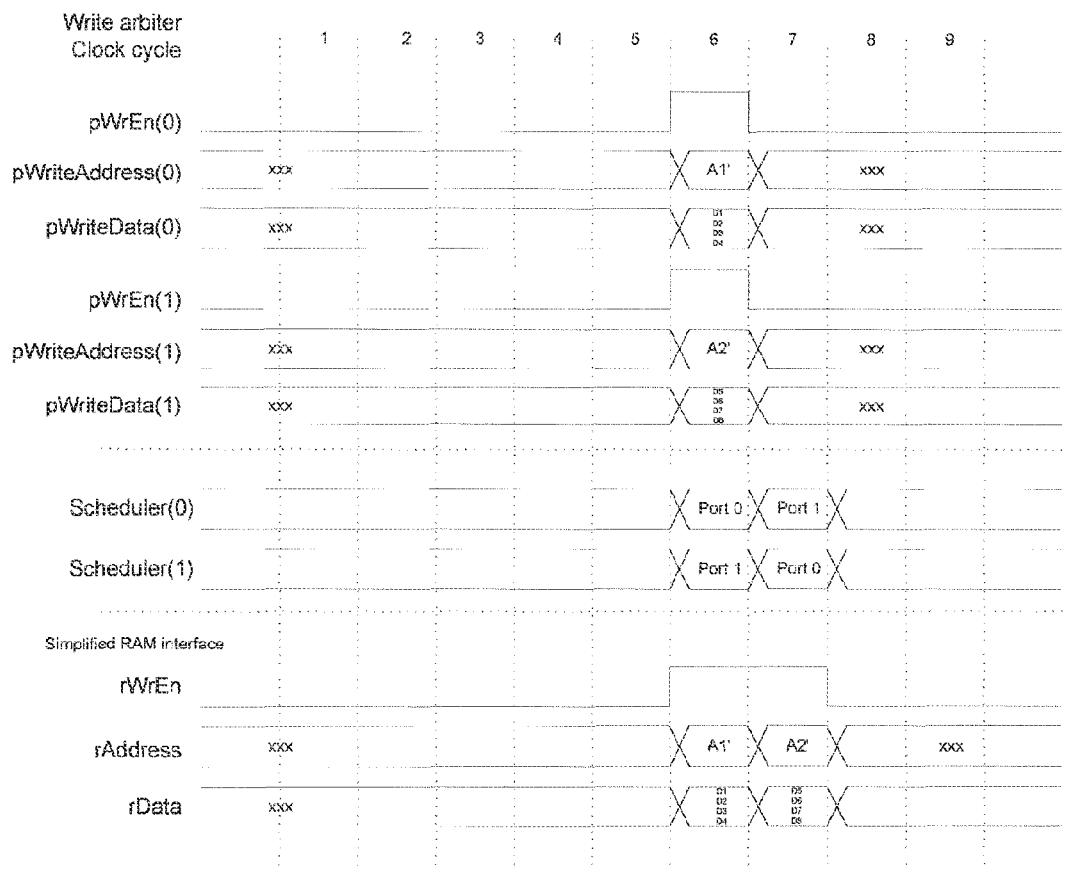
FIG. 7 is a timing diagram illustrating the writing of data to two write ports of the memory controller of FIG. 1, according to various embodiments.

FIG. 7 is a timing diagram illustrating writing of data D1-D4 to the write arbiter 120 from a first write port 110, and writing of data D5-D8 to the write arbiter 120 from a second write port 112 in further detail. In this timing diagram, a clock signal is not shown. However, each signal in the diagram is illustrated with respect to a number of clock cycles of the write arbiter 120, as indicated at the top of FIG. 7.

In clock cycle 6 of FIG. 7, the output of write buffer 214 of the first write port 110, indicated by the signal 'pWriteData(0)' is set to data D1-D4. Additionally the output of the write address buffer 216 of the first write port 110, indicated by signal 'pWriteAddress(0)' is set to address A1', and the write enable signal of the first write port 110 is raised high.

Also in clock cycle 6 of FIG. 7, the output of write buffer 224 of the second write port 112, indicated by the signal 'pWriteData(1)' is set to data D5-D8. Additionally the output of the write address buffer 226 of the second write port 112, indicated by signal 'pWriteAddress(1)' is set to address A2', and the write enable signal of the second write port 112 is raised high.

Thus in clock cycle 6, both write ports 110-112 output data to be written to the shared RAM 150 to the write arbiter 120. As a result two entries in the write queue of the write arbiter 120 are created by the write arbiter 120, one for each of the data to be written to the shared RAM 150 provided by the two write ports.

As shown in FIG. 7, the scheduler of the write arbiter 120 outputs two signals, 'scheduler(0)', which indicates during each clock cycle the write port having first priority, and 'scheduler(1)', which indicates during each clock cycle the write port having second priority.

As indicated by the scheduler(0) signal, in clock cycle 6 of FIG. 6, the first write port 110 has highest priority. The write arbiter 120 thus finds the entry in its write queue that has a port identifier that corresponds to that of the first write port 110 (i.e. step 502 described above) and writes the data in that entry to the shared RAM 150 (i.e. step 504 described above), as shown by the simplified shared RAM interface signals 'rWrEn', 'rAddress' and 'rData' in FIG. 7. That entry is then removed by the write arbiter 120 from the write queue in the same clock cycle as the one in which it was added. In alternative embodiments the write arbiter 120 may not create an entry in the write queue if a write is to be read from a write buffer and then written to shared RAM 150 in the same clock cycle.

The entry in the write queue that was created from the information in the second write port 112, which contains data D5-D8, is stored and remains in the write queue of the write arbiter 120 in clock cycle 6. In clock cycle 7, the write arbiter 120 determines that the entry in the write queue that contains data D5-D8 should be written to shared RAM 150 (as the second write port 112, whose port identifier is stored in that entry, has highest priority according to the scheduler in clock cycle 7). Therefore the write arbiter 120 writes data D5-D8 to the shared RAM 150 (i.e. step 504 described above), as shown by the simplified shared RAM interface signals 'rWrEn', 'rAddress' and 'rData' in FIG. 7. The entry containing data D5-D8 is also removed from the write queue in clock cycle 7.

Each write port 110-112 thus provides a simple-to-use interface for use by a subsystem 160-162 when storing data in the shared RAM 150. By the write arbiter 120 writing 64 bit data (for example) to shared RAM 150 during each of its clock cycles whilst a given write port e.g. 110 receives 16 bit data from a given subsystem during each of its clock cycles, the memory controller 100 can provide that the bandwidth of data read from a write port e.g. 110 by the write arbiter 130 is greater than or equal to the bandwidth of the data written to the write port 110 by a subsystem 160.

The memory controller 100 can thus allow the subsystem 160 to write data into the write port 110 during each clock cycle of the write port 110. This can be done without the write port 110 restricting i.e. gating any of the writes made by the subsystem 160, in order to time writes to the shared RAM 150 by different write ports 110-112 or to prevent the write port's data buffer from overflowing.

Preferably, the bandwidth of data written to the shared RAM 150 by the write arbiter 120 will be greater than or equal to the bandwidth of all the data written into the write ports 110-112 by the subsystems 160-162.

In this embodiment, where data of bit width 16 can be stored in the data buffer of a write port e.g. 110 during each clock cycle of the write port, and data of bit width 64 is written by the write arbiter 120 to shared RAM 150, then provided that the subsystem 160 writes 16 bit data D1-D4 to sequential addresses A1-A4 during four clock cycles of the write port 110, the write arbiter can write data D1-D4 to translated address A1' of the shared RAM 150.

It should be noted that if D1-D4 are written to non-sequential addresses, e.g. B1, B2, C1, C2, then the write arbiter must perform more than one write to the shared RAM 150 to write D1-D4, in this case two writes (one for D1, D2 to translated address B1', and another for D3, D4 to translated address C1'). To enable these two writes, the data buffer and address buffer of a write port may be flushed when data with address C1 is written to the write port. This may be implemented by, for example, raising the flush signal of the write port when data is written to the write port at a translated address that is not equal to the address currently stored in the address buffer of the write port.

Therefore the memory controller can provide maximum bandwidth to the write ports 110-112 when writes to sequential addresses are made by the subsystems 160-162 to those write ports. In order to write D1, D2 (i.e. 32 bits of data) to address B1', for example, without overwriting other data stored at address B1' (i.e. the other 32 bits of data stored at address B1' besides the 32 bits in which D1, D2 will be stored), the write arbiter may be configured to use a data mask bus provided by the shared RAM 150. The 32 bits of this address mask bus that correspond to the bits at address B1' that should not be overwritten during a write operation may for example be set low by the write arbiter 120 when e.g. D1, D2 are written to the shared RAM 150 in order to do this.

A number of alternative embodiments of the write ports and write arbiter will later be described in detail.

Figure 8:
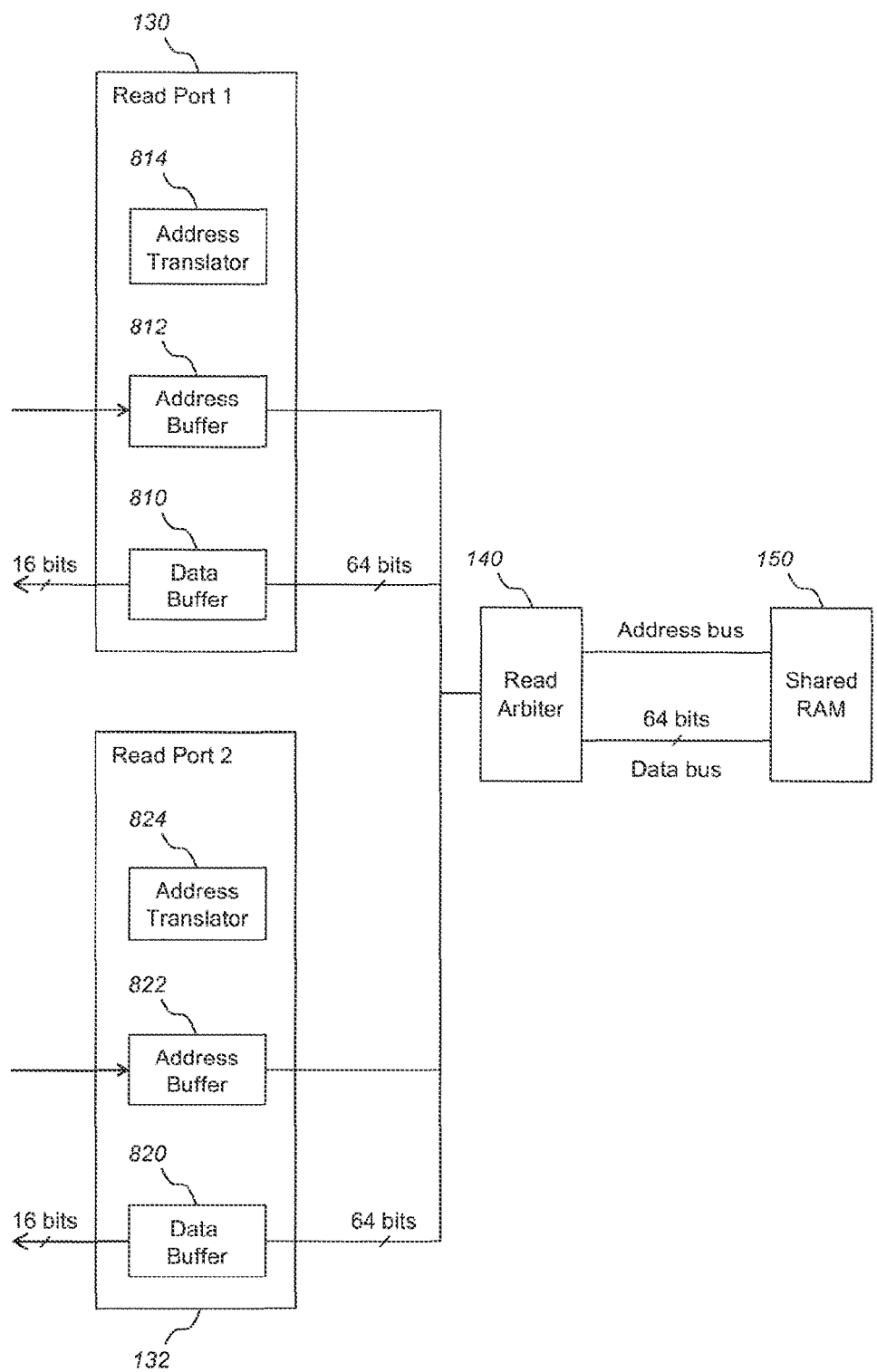
FIG. 8 illustrates schematically in further detail a read portion of the exemplary memory controller of FIG. 1, according to various embodiments.

The read ports 130-132 and read arbiter 140 of a first example of an embodiment of the memory controller 100 will now be described in detail with reference to the portion of the memory controller of FIG. 1 that is shown in FIG. 8.

As shown in FIG. 8, each read port 130-132 of the memory controller 100 includes a data buffer 810, 820, an address buffer 812, 822 and an address translator 814, 824. The general operation of these components will now be summarised in terms of one of the read ports 130 before the operation of a read port is explained in further detail.

The data buffer 810 of read port 130 includes a plurality of storage locations within which data may be stored. Each storage location in the data buffer 810 may include storage for a fixed amount of data, e.g. 16 bits. The address buffer 812 of read port 130 includes locations for storing one or more addresses associated with data stored in the read port. The read port 130 may have an associated address space, and the address translator 814 of the read port 130 serves to translate between the address space of the read port 130, (e.g. that is used in addresses received by the read port 130 from subsystem 160) and the address space of the shared RAM 150.

Examples of the steps involved in reading from a read port 130 four exemplary data, D1, D2, D3 and D4 from sequential addresses A1, A2, A3 and A4, via the shared RAM 150 will now be described in detail, with reference to FIG. 9. Each data D1-D4 read from the read port 110 may for example be 16 bits wide, and the data buffer of the read port may contain four storage locations, i.e. one for each of data D1-D4. It should be noted that the components of the read port may typically perform one or more of the following steps in parallel, as will be clear to those skilled in the art.

Initially the read port 130 receives a request to read data from subsystem 160 (step 900). The read request includes an address, e.g. A1, from which the data is to be read.

The read port 130 then determines whether the data at the address specified in the read request is in the data buffer 810 of the read port 130 (step 902).

In this embodiment, the read port 130 may do this by using the address translator 814 to translate address A1 from the address space of the read port 130 into the address space of the shared RAM 150, i.e. into address A1'. The translated address A1' may then be compared to the one or more addresses in the address buffer 812 of the read port 130. The one or more addresses in the address buffer 812 of the read port may be the addresses in the shared RAM 150 of the data held in the read port 130's data buffer. Thus if translated A1' is equal to one of the addresses in the address buffer 812 of the read port 130, the read port 130 may determine that the data at the address specified in the read request is in the data buffer 810 of the read port 130.

As was described above for a write port, the address space of the read port 130 may provide addresses for data of a first bit width, e.g. 16 bit wide data. The address space of the read port 130 may begin at address 0 and end at address N, thus representing a total of 16N bits of data. As described above the address space of the shared memory 150 may provide addresses for data of a second bit width, e.g. 64 bit wide data, and the address space of the shared memory 150 may begin at address 0 and end at address M, thus representing a total of 64M bits of data. Data in the address space of the read port 130 may thus be stored in a subset of the address space of the shared RAM 150, as described above.

If the read port 130 determines that the data at the address specified in the read request is in the data buffer 810 of the read port 130 it proceeds by returning the requested data from the data buffer 810, as will later be described in detail in step 906.

Otherwise, the read port 130 proceeds to request, via read arbiter 140, the data at the address specified in the read request from the shared memory 150 (step 904). The read port 130 does this by signalling to the read arbiter 140 that it requires the data at the translated address A1' from the shared RAM 150. The read arbiter 140 will process this request and return data D1-D4 from address A1' of the shared RAM 150, as will later be explained in detail. The returned data D1-D4 is written into the data buffer 810 of the read port 130 by the read arbiter 140. Whilst waiting for data D1-D4 to be returned read port 130 stores address A1' in its address buffer 812, to record that data relating to this address will be stored in its data buffer 810.

In this embodiment, whilst waiting for the requested data to be returned from the shared RAM 150, the read port 130 may not process other read requests from the subsystem 160. Whilst not processing other read requests, the read port 130 may for example lower a 'Commands Accepted' signal that is provided to the subsystem 160, in order to indicate to the subsystem 160 that other read requests will not currently be accepted by the read port 130. When the read port 130 is prepared to accept a new read request, the 'Command Accept' signal may be raised.

Once the data at the translated address A1' is retrieved from the shared RAM 150 and stored in the data buffer 810 of the read port 130 by the read arbiter 140, the read port 130 may return the requested data to the subsystem 160 (step 906). The requested data may be returned from the appropriate storage location in the data buffer of the read port, in accordance with the address A1 provided to the read port 130 in the read request.

Note that if in step 902 the read port 130 determined that the data at the address specified in the read request is already in the data buffer 810, then the requested data may be returned from the appropriate storage location in the data buffer 810 of the read port 130 without the data first being requested from the shared RAM via the read arbiter 140.

Figure 10:
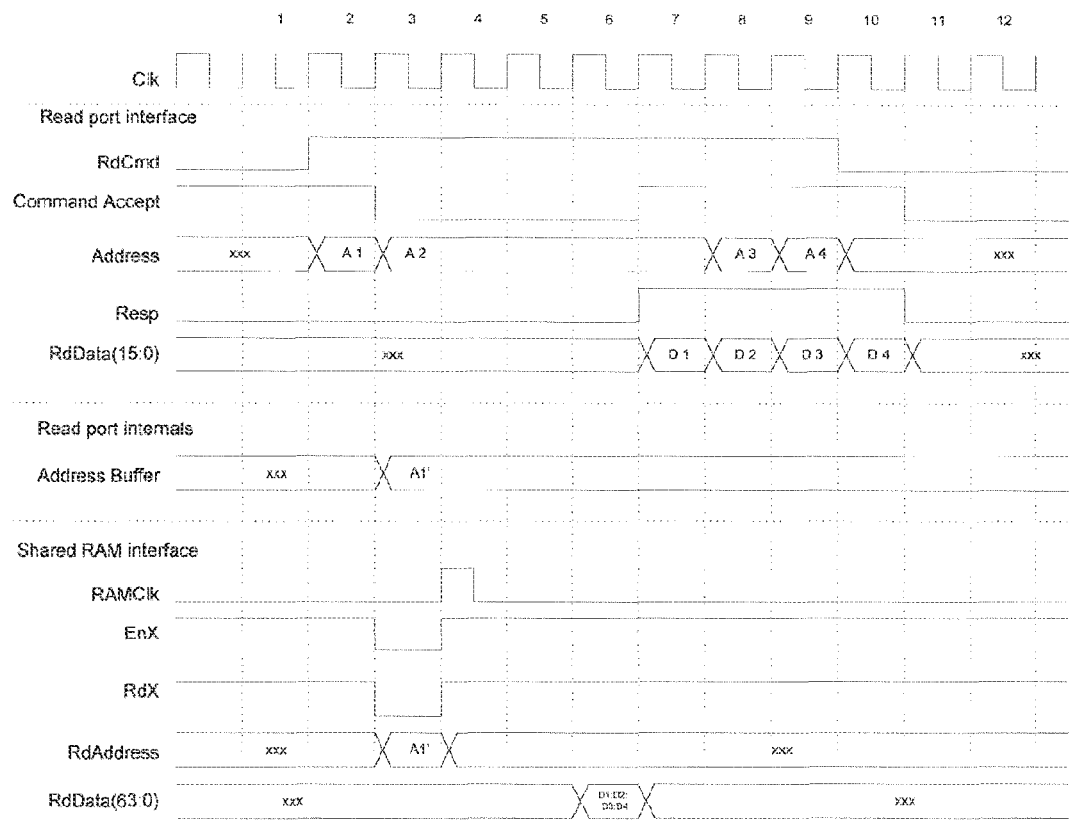
FIG. 10 is a timing diagram illustrating the reading of data from a read port of the memory controller of FIG. 1, according to various embodiments.

FIG. 10 is a timing diagram illustrating the reading of data D1-D4 at addresses A1-A4 from the read port 130 in greater detail. The clock cycles of the read port 130 are shown by the signal 'Clk'.

The signals 'RdCmd', 'Command Accept', 'Address', 'Resp' and 'RdData(15:0)' in FIG. 10 form the interface between the subsystem 160 and the read port 130. The signal 'RdCmd' is provided to the read port 130 by the subsystem 160, and is raised high in clock cycles where the subsystem 160 wishes to read data from the read port 130 at an address specified in the 'Address' signal, also provided to the read port 130 by the subsystem 160. The 'Command Accept' signal provided by the read port 130 to the subsystem 160, used to indicate that read requests will not currently be accepted by the read port 130, is also shown. The 'Resp' signal is set high by the read port 130 to indicate that a request for data has been processed and that the read data is currently output on the 'RdData(15:0)' signal of the read port 130.

The 'Address Buffer' signal in FIG. 10 represents the data stored in the address buffer 812 of the read port 130.

The signals 'RAMClk', 'EnX', 'RdX', 'RdAddress' and 'RdData(63:0)' in FIG. 10 form the interface between the read arbiter 140 and the shared RAM 150. The 'RAMClk' signal is the clock signal of the shared RAM 150, provided by the memory controller 100. The 'EnX' and 'RdX' signals are the shared RAM enable and read signals, respectively; to enable a read from the shared RAM 150 both signals must be set low. The 'RdAddress' signal indicates the address of the shared RAM 150 from which data should be read. The 'RdData(63:0)' signal is provided by the shared RAM 150 and contains data read from the requested addresses.

Figure 9:
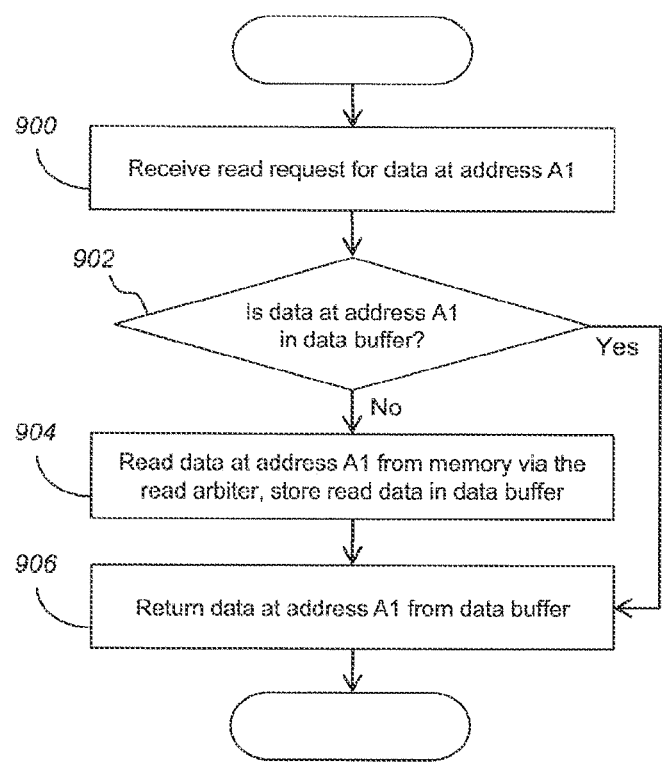
FIG. 9 illustrates schematically a block diagram indicating an example of steps performed in reading from a read port of the memory controller of FIG. 1, according to various embodiments.

In clock cycle 2 of FIG. 10 a read of address A1 is requested by subsystem 160, by it setting the 'RdCmd' signal high and setting the 'Address' signal to address A1 (i.e. step 900 of FIG. 9). The 'Command Accept' signal of the read port 130 is set high during this clock cycle, indicating that this read request will be accepted by the read port 130.

In clock cycle 3 read port 130 determines that the data for address A1 is not in its data buffer 810 (i.e. step 902). This is done by comparing address A1', translated from the received address A1, with the address in the address buffer 812 of the read port 130 at the end of clock cycle 2, and by determining that this comparison indicates these addresses are different. Read port 130 therefore initiates a read of address A1' via the read arbiter 140 (i.e. step 904). The interface between read ports 130-132 and the read arbiter 140 will later be described in further detail.

The read arbiter 140 will also later be described in further detail. In this example the read arbiter schedules the read of the read address A1' from read port 130 in clock cycle 3, by lowering shared RAM enable signal 'EnX' and read signal 'RdX', and by setting the read address bus 'RdAddress' to translated address A1'. The address on the address bus is thus clocked into the shared RAM 150 on the rising edge of the 'RAMClk' signal at the start of clock cycle 4. The shared RAM responds with requested data two clock cycles after an address is clocked into the shared RAM 150. Thus in the case of address A1' the requested data D1-D4 is returned in clock cycle 6 on the data bus 'RdData(63:0)'. In clock cycle 6, data D1-D4 is thus read from the shared RAM 150 data bus by the read arbiter 140 and stored in the data buffer 810 of read port 130. The read arbiter 140 signals to read port 130 that the read of the address A1' has been processed, e.g. by raising a read processed signal (not shown) in clock cycle 6.

Whilst the read of address A1 is being processed by read arbiter 140 in clock cycles 3-6, read port 130 sets the 'Command Accept' signal low, indicating to subsystem 160 that new read requests will not currently be accepted. After requesting the read of address A1 in clock cycle 2, subsystem 160 attempts to read address A2 in clock cycle 3 by setting the 'Address' signal to A2, but as new read requests are not being processed by read port 130 in clock cycles 3-6, the 'Address' signal is kept at A2 by subsystem 160 until read port 130 indicates it will accept new read requests.

After read arbiter 140 signals to read port 130 that the read of the address A1' has been processed in clock cycle 6, data D1 is returned to subsystem 160 from data buffer 810 of read port 130 in clock cycle 7, and read port 130 indicates to subsystem 160 that the read has been processed by raising response signal 'Resp' high (i.e. step 906). Additionally read port 130 raises the 'Command Accept' signal to indicate that further read requests will be accepted.

Subsystem 160's request to read address A2 is thus accepted by read port 130 in clock cycle 7. Read port 130 determines that the data for address A2 is in its data buffer 810 and thus responds with data D2 in clock cycle 8. As data D2 did not need to be retrieved from shared RAM 150, the 'Command Accept' signal is kept high to indicate that further read requests will be accepted. Reads from addresses A3 and A4 are requested by subsystem 160 in clock cycles 8 and 9, and data D3 and D4 are returned by read port 130 in the same way in clock cycles 9 and 10, respectively.

Figure 11:
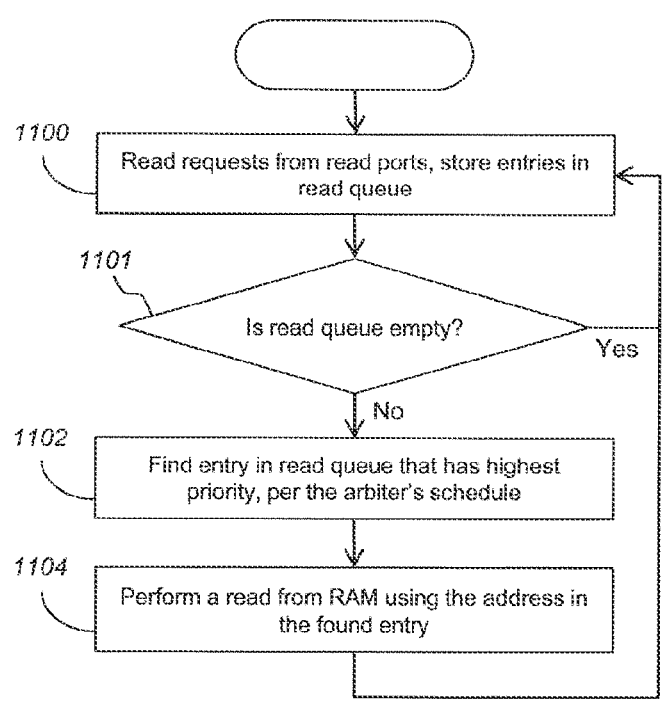
FIG. 11 illustrates schematically a block diagram indicating an example of steps performed in reading data from a shared RAM, according to various embodiments.

Examples of the steps performed by the read arbiter 140 in reading data at an address specified by a read port 130-132 from the shared RAM 150 will now be described with reference to the steps of FIG. 11. It should be noted that read arbiter 130 may typically perform one or more of the following steps in parallel, as will be clear to those skilled in the art.

Initially read arbiter 140 reads the read requests provided by the read ports 130-132 (step 1100). A read request may for example be provided to read arbiter 140 by a read port 130 by that read port 130 raising a read enable signal it provides to read arbiter 140, and by read port 130 setting the read request address e.g. A1' on an address bus connecting read port 130 and read arbiter 140.

In this embodiment, in order to enable the read arbiter 140 to efficiently handle simultaneous reads from the read ports 130-132 (e.g. where the read enable signal of a read port is raised by multiple read ports in the same clock cycle), the read arbiter 140 includes a read queue.

Each entry in the read queue contains an address from a read request and a port identifier. These are stored in the read queue of the read arbiter 140 so that they can be used when the read arbiter 140 reads from shared RAM 150. When reading the read requests from the read ports 130-132 as described above, the read arbiter 140 stores information that is read from the read ports in the read queue of the read arbiter 140 as is now described.

When reading read requests provided by the read ports 130-132 in step 1100, read arbiter 140 may determine, for each read port, whether the read enable signal provided by the read port is raised high. If it is, the read arbiter 140 determines that the address on the address bus of that read port is to be used to read shared RAM 150. If that is the case, the read arbiter 120 thus reads the address provided by the read port and stores it in a new entry at the end of its read queue. It also stores in the new entry a port identifier that identifies the port from which the address has been read, e.g. if the address has been read from port 1, then the value 1 is stored in the entry in the read queue.

Once each of the read ports 130-132 has been read in this way, the read arbiter 140 then checks its read queue to see if it is empty (step 1101). If the read queue is empty (e.g. because no new entries were stored in the read queue during the current clock cycle, and because no entries from previous clock cycles are present in the read queue), the read arbiter 140 may not perform a read from the shared RAM 150 during this clock cycle, and may thus return to step 1100.

Thus the read arbiter 140 is configured to be able to accept read requests from the read ports 130-132 during every clock cycle (and to perform a read from shared RAM 150 every clock cycle, as is later described). However the read arbiter 140 need not accept read requests every clock cycle, and/or may not perform a read from shared RAM 150 every clock cycle, if an insufficient number of reads requests are provided. Typically at least one of the subsystems 160-162 using the read ports 130-132 may read a high bandwidth of data from the shared RAM 150. Thus it can be expected that read requests are typically accepted every clock cycle, and that reads from shared RAM 150 are performed every clock cycle.

If the read queue is not empty, the read arbiter 140 proceeds by finding an entry in the read queue that has the highest priority, according to a schedule provided by a scheduler of the read arbiter 140 (step 1102). The scheduler of the read arbiter assigns a priority ordering to the read ports, such that during each clock cycle, a different read port has priority over other read ports. The scheduler may for example assign a different priority to each read port in each clock cycle of the read arbiter 140 such that the read port with highest priority changes according to a round robin schedule.

The read arbiter 140 may find the entry in the read queue that has the highest priority by searching through the entries in the read queue of the read arbiter 140 and comparing the port identifiers of the entries to the schedule provided by the scheduler.

If, for example, in a given clock cycle the scheduler indicates that read port 1 has the highest priority in the schedule, then the read arbiter 140 checks whether there are any entries in the read queue having the port identifier of read port 1. If the read arbiter 140 determines that there is no entry in the read queue having the port identifier of read port 1, it then checks whether there are any entries in the read queue having the port identifier of the read port with the next highest priority, etc.

The read arbiter 140 continues in this way until an entry in the read queue is identified. Once such an entry is identified, the read arbiter 140 performs a read from shared RAM 150 using the address contained in that entry, and removes that entry from the read queue (step 1104). The read arbiter then returns to step 1100 for the next clock cycle.

The read queue may thus implement a priority queue, where the priorities are provided by the scheduler of the read arbiter 140.

In this embodiment, if in a given clock cycle the read queue of the read arbiter 140 is empty when the read arbiter reads the read requests of the read ports 130-132 in step 1100, the read request of the read port having the highest priority according to the scheduler is performed using shared RAM 150, and any other read requests in the read ports 130-132 are stored in the read queue. These other read requests are then performed in subsequent clock cycles.

Thus in this embodiment, read arbiter 140 is configured to be able to, during each clock cycle of the read arbiter 140, receive a read request from one read port 130-132 (or from the read arbiter's read queue) and perform a corresponding read from shared RAM 150. Interfaces for reading data from a RAM device are known in the art and may be used by the read arbiter 140 to read data from shared RAM 150.

Figure 12:
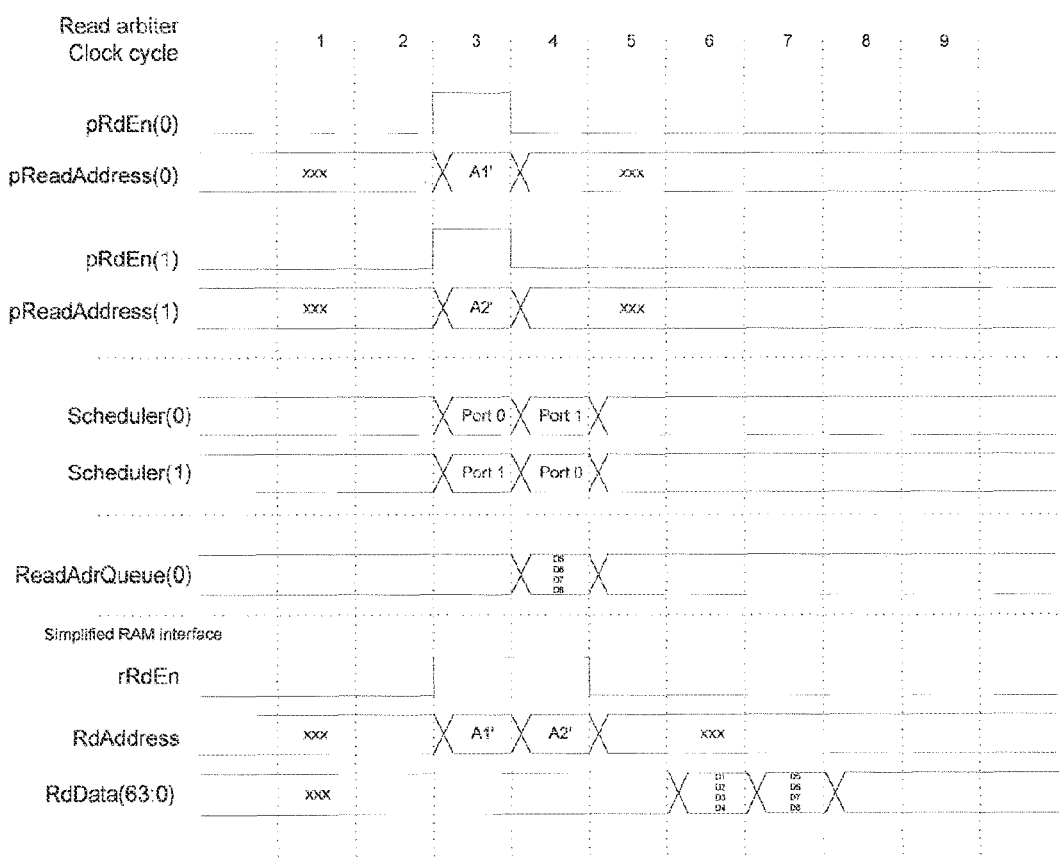
FIG. 12 is a timing diagram illustrating the reading of data from two read ports of the memory controller of FIG. 1, according to various embodiments.

FIG. 12 is a timing diagram illustrating reading of data D1-D4 by read arbiter 140 on behalf of first read port 130, and reading of data D5-D8 by read arbiter 140 on behalf of second read port 132 in further detail. In this timing diagram, a clock signal is not shown. However, each signal in the diagram is illustrated with respect to a number of clock cycles of the read arbiter 140, as indicated at the top of FIG. 12.

In clock cycle 3 of FIG. 12, the read enable output 'pRdEn(0)' of first read port 130 is set high, and its address bus 'pReadAddress(0)' is set to address A1'.

Also in clock cycle 3 of FIG. 12, the read enable output 'pRdEn(1)' of second read port 132 is set high, and its address bus 'pReadAddress(1)' is set to address A2'.

Thus in clock cycle 3, both read ports 130-132 try to initiate reads of the shared RAM 150 via read arbiter 140. As a result, two entries in the read queue of the read arbiter 140 are created by the read arbiter 140, one for each of the addresses to be read from the shared RAM 150 provided by the two read ports.

As shown in FIG. 12, the scheduler of the read arbiter 140 outputs two signals, 'scheduler(0)', which indicates during each clock cycle the read port having first priority, and 'scheduler(1)', which indicates during each clock cycle the read port having second priority.

As indicated by the scheduler(0) signal, in clock cycle 3 of FIG. 12, first read port 130 has highest priority. The read arbiter 140 thus finds the entry in its read queue that has a port identifier corresponding to that of the first read port 130 (i.e. step 1102 above) and reads the data at address A1', where A1' is specified in the entry that is found, from shared RAM 150 (i.e. step 1104 described above), as shown by the simplified shared RAM interface signals 'rRdEn', 'RdAddress'. Note that data D1-D4 at address A1' is not returned on the data bus 'RdData(63:0)' of shared RAM 150 until two clock cycles after address A1' is clocked into shared RAM 150, i.e. in clock cycle 6. When data D1-D4 is returned by the shared RAM 150 it is stored in the data buffer of first read port 131 by read arbiter 140. The entry in the read queue that was found is then removed from the read queue in the same clock cycle as the one in which it was added. In alternative embodiments, the read arbiter may not contain an entry in the read queue if a read request is to be read from a read port and then performed using the shared RAM 150 in the same clock cycle.

The entry in the read queue that was created by the read arbiter 140 for the read request of the second read port 132, which contains data A2', is stored in and remains in the read queue of the read arbiter 140 in clock cycle 3.

In clock cycle 4, the read arbiter 140 determines that the entry in the read queue that contains address A2' should be used to perform a read from the shared RAM 150 (as the second read port 132 has highest priority in clock cycle 4, according to the scheduler, and no other entries are in the read queue). Therefore the read arbiter 140 reads the data at address A2' from shared RAM 150 (i.e. step 1104 described above), as shown by the simplified shared RAM interface signals 'rRdEn', 'RdAddress'. The entry containing address A2' is also removed from the read queue of the read arbiter 140 in clock cycle 4. Note that data D5-D8 at address A2' is not returned on the data bus 'RdData(63:0)' of shared RAM 150 until two clock cycles after address A2' is clocked into shared RAM 150, i.e. in clock cycle 7. When data D5-D8 is returned by the shared RAM 150 it is stored in the data buffer of second read port 132 by read arbiter 140.

Each read port 130-132 of the memory controller 100 thus provides a simple-to-use interface for use by a subsystem 160-162 to read data from shared RAM 150. By the read arbiter 140 reading 64 bit data (for example) from shared RAM 150 during each of its clock cycles whilst a given read port e.g. 130 may have 16 bit data read from it by a given subsystem during each of its clock cycles, the memory controller 100 can provide that the bandwidth of data written to a read port e.g. 130 by the read arbiter 140 is greater than or equal to the bandwidth of the data read from the read port 130 by a subsystem 160.

The memory controller 100 can thus allow the subsystem 160 to read data from the read port 130 during each clock cycle of the read port 130. When data for a requested address is not in the read port however a delay occurs between the read request being made and the data being made available, due to the delay of reading from shared RAM 150.

Preferably, the bandwidth of data read from the shared RAM 150 by read arbiter 140 will be greater than or equal to the bandwidth of all the data read from the read ports 130-132 by the subsystems 160-162.

In this embodiment, where data of bit width 16 can be read from the data buffer of a read port e.g. 130 during each clock cycle of the read port, and data of bit width 64 is read by the read arbiter 140 from shared RAM 150, then provided that the subsystem 160 sequentially reads four data D1-D4 each of 16 bit width from sequential addresses A1-A4 of the read port 130, the read arbiter 140 can read D1-D4 from the data stored at one translated address, e.g. A1', of the shared RAM 150.

It should be noted that if four sequential data each of 16 bit width are read from non-sequential addresses, e.g. B1, B2, C1, C2, then the read arbiter 140 must perform more than one read from the shared RAM 150 to read the four data, in this case two reads (one for translated address B1', and another for translated address C1'). Therefore the memory controller 100 can provide maximum bandwidth to the read ports 130-132 when reads to sequential addresses are made by the subsystems 160-162 to those read ports.

The above embodiments are to be understood as illustrative examples of the invention. Further embodiments of the invention are envisaged, as is described below.

It will be appreciated that only one 'side', i.e. write side or read side, of the memory controller 100 may be used in some applications. For example, the memory controller could include only the write ports 110-112 and write arbiter 120, in which case other known techniques could be used to read from the shared RAM 100. Alternatively the memory controller could include only the read ports 130-132 and read arbiter 140, in which case other known techniques could be used to write to the shared RAM 100.

In the first embodiment described above, the write arbiter 120 may write M bit data (e.g. 64 bit data) to shared RAM 150 during each of its clock cycles whilst a given write port receives N bit data (e.g. 16 bit data) from a given subsystem during each of its clock cycles. As described above memory controller 100 can provide that a first write bandwidth requirement is satisfied for that write port such that the bandwidth of data read from the write port by the write arbiter 130 is greater than or equal to the bandwidth of the data written to the write port by a subsystem.

Preferably a second write bandwidth requirement is also satisfied such that the bandwidth of data written to the shared RAM 150 by the write arbiter 120 will be greater than or equal to the bandwidth of all the data written into the write ports 110-112 by the subsystems 160-162.

It will be appreciated that, as well as bit widths M and N above, the clock frequency of the write arbiter 120 relative to that of the write ports 110-112 is another factor that may be selected to ensure that one or more of the write bandwidth requirements may be satisfied.

In one example, the clock signals of each write port 110-112 and the clock signal of the write arbiter 120 may have substantially the same clock frequency, whilst the bit width M for each write port and bit width N of the write arbiter may be selected to ensure the write bandwidth requirements above may be satisfied. The first write bandwidth requirement may be satisfied by selecting M>=N for a given write port, and the second may be satisfied by selecting M>=p*N, where p is the number of write ports.

In another example, the bit widths M and N may be substantially the same, whilst the clock frequency $f_n$ of each write port 110-112 and the clock frequency $f_A$ of the write arbiter 120 may be selected to ensure the write bandwidth requirements may be satisfied above. The first write bandwidth requirement may be satisfied by selecting $f_A>=f_n$ for a given write port, and the second may be satisfied by selecting $f_A>=p*f_n$, where p is the number of write ports.

It will also be appreciated that, as well as the factors above, the number of data $d_A$ written to the shared RAM 150 in a given clock cycle of the write arbiter 120 relative to the number of data $d_n$ written to a write port by a given subsystem in a given clock cycle of the write port is another factor that may be selected to ensure that one or more of the write bandwidth requirements may be satisfied.

In one example, the clock signals of each write port 110-112 and the clock signal of the write arbiter 120 may have substantially the same clock frequency and the bit widths M and N may be substantially the same, whilst the number of data $d_A$ written to the shared RAM 150 in a given clock cycle of the write arbiter 120 and the number of data $d_n$ written to a write port by a given subsystem in a given clock cycle of the write port may be selected to ensure the write bandwidth requirements above may be satisfied. The first write bandwidth requirement may be satisfied by selecting $d_A>=d_n$ for a given write port, and the second may be satisfied by selecting $d_A \geq p*d_n$, where p is the number of write ports.

It will also be appreciated that, as well as the factors above, the number of write ports 110-112 is another factor that may be selected to ensure that one or more of the write bandwidth requirements may be satisfied.

It will be appreciated that combinations of the above factors, i.e. the bit widths of data written to write ports/written by the write arbiter, the clock frequencies of the write ports/the write arbiter, the number of data written to the write ports/by the write arbiter and the number of write ports, can be selected to ensure that one or more of the above write bandwidth requirements may be satisfied.

It will be appreciated that the minimum number of storage locations needed in the data buffer of a write port may be determined according to the factors above. For example, if there are two write ports, each accepting 16 bit data each clock cycle, and a write arbiter that writes 32 bits of data to shared RAM each clock cycle, where the clock frequencies of the write ports and arbiter are the same, then each write port requires a data buffer of at least 32 bit width (i.e. containing two storage locations of 16 bits each), in order to ensure that the data buffers of the write ports 110-112 does not overflow.

It will be appreciated that equivalent factors affect the bandwidth of the read ports and the read arbiter, i.e. the bit widths of data read from read ports/read by the arbiter, the clock frequencies of the read ports/the read arbiter, the number of data read from the read ports/by the read arbiter and the number of read ports, can be selected to ensure that read bandwidth requirements for the read ports and read arbiter may be satisfied. A first read bandwidth requirement may be satisfied for a read port if the bandwidth of data written to the read port by the read arbiter 140 is greater than or equal to the bandwidth of the data read from the read port by a subsystem. A second read bandwidth requirement may be satisfied if the bandwidth of data read from the shared RAM 150 by read arbiter 140 is greater than or equal to the bandwidth of all the data read from the read ports 130-132 by the subsystems 160-162. It will be appreciated that the minimum number of storage locations needed in the data buffer of a read port may also be determined according to the above factors, in a similar way to the minimum number of storage locations needed in the data buffer of a write port.

Alternative embodiments of the memory controller 100 are envisioned where the operations performed by any of the write ports 110-112, read ports 130-132, write arbiter 120 and/or read arbiter 140 in the first embodiment may be performed in different orders and/or across one or more different clock cycles of their respective clocks. Retiming of digital circuits in this manner is well known in the art.

It will be appreciated that connections between any of the shared RAM 150, write arbiter 120, read arbiter 140, write ports 110-112, read ports 130-132 and subsystems 160-162 may be registered and/or buffered e.g. as described above, or may have registers and/or buffers added or removed in order to alter the timing of data transmission between these components. For example, registers/buffers could be omitted and/or arranged in a read port 130 so that if a read request for data at address A1 is passed to the read port by a subsystem in a given clock cycle, the read port can respond to that request with data D1 within the same clock cycle, e.g. if D1 is stored in the data buffer of the read port (i.e. rather than after one clock cycle after the request is received, as described above).

In an alternative embodiment address translators may be omitted from one or more of the write ports 110-112 and/or read ports 130-132. In this case subsystems 160-162 may use memory addresses in the address space of the shared RAM 150 when writing to write ports and/or reading from read ports.

It will be appreciated that embodiments may incorporate any number of subsystems, write ports, and/or read ports.

Whilst the above description refers principally to the use of a single RAM 150, it will be appreciated that plural shared RAM device e.g. 150-154 may be shared by the memory controller 100. If multiple shared RAM devices 150-154 are used they may provide a wider data bus than a single shared RAM, e.g. two shared RAMs each having a 64 bit data bus may be provided with the same address on each read/write operation in order to provide a 128 bit data bus. Multiple shared RAM devices 150-154 may additionally or alternatively be used to provide a larger address space, e.g. one shared RAM may provide addresses 0 to $m_1$, whilst second shared RAM may provide addresses $m_1+1$ to $m_2$.

In an alternative embodiment a read port e.g. 130 may not block i.e. stop processing read requests when it determines that data requested in a read request is not currently stored in the read ports data buffer 810. After receiving a first read request for data not in its data buffer 810, read port 130 may continue to accept read requests in subsequent clock cycles whilst the read arbiter 140 retrieves data for the first read request from shared RAM 150. If, for example, a second read request and a third read request are received after the first read request, where the first to third requests are for sequential addresses A1-A3, addresses A2 and A3 may be stored in a read request buffer by the read port. Once the first read request has been responded to by the read port 130 (i.e. once the read port has provided D1 to subsystem 160), it may then process read requests in its read request buffer, e.g. such that the second read request is responded to one clock cycle after the first request is responded to, etc.

In an alternative embodiment, the memory controller 100 may maintain coherency between data stored in the data buffers of different write ports. If, for example, data D1 is written to address A1 in a first write port 110 on clock cycle 1, and data D2 is written to address A1 in a second write port 112 on clock cycle 2, the memory controller 100 should ensure that data D1 is written to address A1 in shared RAM 150 before data D2 is written to address A1. Without maintaining coherency between the data buffers of the write ports it may be possible for D2 to be written to shared RAM 150 before D1, which could cause data errors in the subsystems 160-162.

The memory controller 100 may maintain coherency of the write ports by ensuring that data stored in the data buffer of a first write port, e.g. 110, is updated with data written into a second write port, e.g. 112, if both data are written to the same address of the shared RAM 150. This may be done by comparing, when data is written to the second write port, the addresses in the address buffer of the first write port against the translated address of the data written into the second write port. If the addresses match, the memory controller detects that the data buffer of first write port 110 contains a copy of data stored at the address indicated by the write performed at second write port 112, and therefore updates the copy of the data stored in the data buffer of the first write port 110 with the new data, in order to ensure data coherency.

In another alternative embodiment, the memory controller 100 may additionally or alternatively maintain coherency between data stored in the data buffers of read ports in response to data written into the write ports. If, for example, data D1 is read from address A1 of the shared RAM 150 and stored in the data buffer of read port 130 on clock cycle 1, and data D2 is written to address A1 in write port 110 on clock cycle 2, the memory controller 100 should ensure that data D1 in the data buffer of read port 130 is overwritten with data D2 in clock cycle 2. Without maintaining coherency between the data buffers in this way it may be possible for D1 to be read after D2 was written, which could cause data errors in the subsystems 160-162.

The memory controller may 100 maintain coherency in this case by ensuring that data stored in the data buffer of a read port, e.g. 130, is updated with data written into a write port, e.g. 110, if both data relate to the same address of the shared RAM 150. This may be done by comparing, when data is written to the write port, the addresses in the address buffer of the read port against the translated address of the data written into the write port. If the addresses match, the memory controller detects that the data buffer of read port 130 contains a copy of data stored at the address indicated by the write performed at write port 110, and therefore updates the copy of the data stored in the data buffer of the read port 130 with the new data, in order to ensure data coherency.

In an alternative to any preceding embodiment, the write ports may each be configured to store data in a separate address space of the shared RAM 150. In this way the need for coherency between write ports may be avoided.

In another alternative embodiment, the memory controller 100 may allow a read request in a first read port to be serviced by reading data stored in the data buffer of a second read port.

If, for example, data D1 from address A1 of the shared RAM is stored in the data buffer of read port 130, and a read request is received at read port 132 to read data D1, the memory controller may be configured to respond to the read request by providing data D1 from the data buffer of read port 130. This may be done by comparing the addresses in the address buffer of read port 132 against the translated address of the received read request. If the addresses match, the memory controller detects that the data buffer of read port 130 contains a copy of data stored at the desired address, and therefore enables read port 132 to respond to the read request with that copy of the data.

In this way, in response to a first read port determining that a received read request is for data not in the data buffer of the first read port, the memory controller 100 may determine whether the data is in the data buffer of the other read ports. If the requested data is in the data buffer of one of the other read ports the first read port can respond to the read request by reading the data from the data buffer of that other read port, rather than by reading the data from the shared RAM 150 via the read arbiter 150.

In another alternative embodiment, the read arbiter 140 may pre-fetch additional data in response to a first read request received by a read port e.g. 130 from the shared RAM 150, and store the pre-fetch data in the data buffer of that read port 130. The pre-fetch data is thus different from the data requested in the read request and was not requested in that read request.

For example, a read port 130 may include a data buffer of 128 bits, and the shared RAM 150 may have a data bus of 64 bits. If the read port 130 is requested to read data from shared memory address A1, and does not have data for address A1 in its data buffer, then read arbiter 140 will read data from address A1 of the shared RAM 150 and store this data in the data buffer of read port 130. In this alternative, the read arbiter 140 also requests data from address A2, e.g. the next address in the shared RAM 150 after address A1, once it has requested the data from address A1. The data from address A2 is also then stored in the data buffer of read port 130, e.g. data D1-D4 from address A1 may be stored in the first 64 bits of the data buffer of the read port 130, and data D5-D8 from address A2 may be stored in the second 64 bits of the data buffer of the read port 130.

By pre-fetching data in this way, the read arbiter 140 may pre-emptively read data from the shared RAM 150 for a given read port, in order to reduce the delay in processing later read requests made to the read port for that data.

In an alternative to any embodiment, the write ports may not include write buffers and/or write address buffers. In these embodiments, the write arbiter may read data to be written to RAM from the data buffer of each write port (e.g. once the write port has been flushed) and memory addresses to which this data is to be written from the address buffer of each write port.

In an alternative to any embodiment, the address buffer and/or write address buffer of a write port may comprise one address location for each storage location in the write port's data buffer. In this case, address translation may be performed when a data buffer is flushed, rather than when an address is written to the write port.

In an alternative to any embodiment, a single port RAM may be used as the shared RAM device 150, rather than a dual port RAM, as described in the above embodiments. In this alternative, the read arbiter and write arbiter of the memory controller share the address bus and data bus of the single port RAM.

It will be appreciated that the subsystems 160-162, memory controller 100 and shared RAM 150 may be arranged in a number of different configurations on one or more semiconductor devices. Examples of some configurations follow. The subsystems 160-162, memory controller 100 and shared RAM 150 may all be arranged on the same semiconductor device. In an alternative, one or more of the subsystems 160-162 may be located on one or more separate devices. Additionally or alternatively the write arbiter 120 and/or write ports 110-112 may be arranged on a separate device. Additionally or alternatively the read arbiter 140 and/or read ports 130-132 may be arranged on a separate device. Additionally or alternatively the shared RAM 150 may be arranged on a separate device.

Thus, in general, it will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A memory controller providing a plurality of write ports that allow shared access to at least one memory device, the memory controller comprising:
   a plurality of write ports, at least one of the write ports having a clock frequency and comprising:
   a data buffer having a plurality of storage locations, wherein said data buffer is configured to allow data of a first bit width to be written to at least a first number of its storage locations at a pre-determined time;
   an address buffer having a plurality of address locations, the address buffer being configured to allow addresses to be written to a first number of its address locations; and
   an address translator configured to translate an address associated with data written to a storage location in the data buffer from an address space of the write port to an address space of at least one memory device, such that an address contained in a given address location in the address buffer relates to a memory address of at least one memory device to which data held in a corresponding storage location of the data buffer of the write port is to be written,
      wherein the write port is configured to determine if a plurality of translated addresses stored in the address buffer relate to a common memory address of the at least one memory device;
      wherein an arbiter having a clock frequency and configured to, responsive to a determination that a plurality of translated addresses stored in an address buffer relate to a common memory address of at least one memory device, read data of a second bit width, the second bit width being greater than the first bit width, from a second number of storage locations of a data buffer associated with said plurality of translated addresses at a pre-determined time and write the data that is read to said at least one memory device;
      wherein said data buffer is configured to allow data to be written to a first number of its storage locations during every clock cycle of the write port, and wherein said arbiter is configured to be able to read said data during every clock cycle of the arbiter, and
      wherein the second number of storage locations read by the arbiter, the clock frequency of the arbiter, the first number of storage locations written to said write ports and the clock frequency of said write port provide that the bandwidth of data read from said write port by the arbiter is greater than the bandwidth of data written to said write port.

2. A memory controller according to claim 1, wherein the second number of storage locations read by the arbiter are storage locations having addresses in said address buffer that relate to a first memory address in the at least one memory device.

3. A memory controller according to claim 1, the memory controller being configured to write update data to one or more update storage locations of the data buffers of one or more write ports in response to the update data being written to one or more storage locations of the data buffer of a first write port, on the basis of a relationship between the corresponding addresses of the one or more update storage locations and the corresponding addresses of the one or more storage locations of the first write port in which the update data is written.

4. A memory controller according to claim 1, wherein the clock frequency of the arbiter is substantially equal to the clock frequency of each write port.

5. A memory controller according to claim 1, wherein each write port is configured to allow the arbiter to read data from storage locations in the data buffer of the write port in response to receiving a flush signal.

6. A memory controller according to claim 1, wherein the arbiter includes a scheduler configured to select a different one of the write ports during different clock cycles of the arbiter, and wherein the arbiter is configured to read said data from a second number of storage locations of the data buffer of the write port selected by the scheduler.

7. A memory controller according to claim 1, comprising:
   a plurality of read ports, at least one of the read ports having a clock frequency and comprising a data buffer having a plurality of storage locations capable of containing data read from at least one memory device, wherein said read port is configured to respond to a request to read data in the data buffer by reading the data from a first number of said storage locations, and wherein the read port is configured to respond to a request to read data not in the data buffer by reading the data from a first number of said storage locations once the data has been read from the at least one memory device; and
   an arbiter having a clock frequency and configured to be able to read, at a pre-determined time, data from the at least one memory device on behalf of one of the read ports, and to write the read data into a second number of storage locations of the data buffer of the read port on whose behalf the data was read.

8. A memory controller according to claim 7, wherein the memory controller is configured to write update data to one or more update storage locations of the data buffers of one or more read ports in response to said update data being written to one or more storage locations of the data buffer of a first write port, on the basis of a relationship between corresponding memory addresses of the one or more update storage locations and corresponding memory addresses of the one or more storage locations of the first write port in which said update data is written.

9. A memory controller providing a plurality of read ports that allow shared access to at least one memory device, the memory controller comprising:
   a plurality of read ports, at least one of the read ports having a clock frequency and comprising:
   a data buffer having a plurality of storage locations capable of containing data of a first bit width read from at least one memory device;
   an address translator configured to translate an address associated with a request to read data from a storage location in the data buffer from an address space of the read port to an address space of at least one memory device;
   an address buffer capable of storing at least one memory address that relates to at least one memory address of the at least one memory device from which data in one or more of the storage locations of the data buffer was read; and
      wherein said read port is configured to respond to a request to read data in the data buffer by reading the data from a first number of said storage locations,
      wherein the read port is configured to determine if a received request to read data is for data in the read port's data buffer on the basis of a relationship between the at least one address included in the request and the at least one memory address in the read port's address buffer,
      wherein the read port is configured to, when said data is determined to be in said data buffer, respond to a request to read data by reading the data from a first number of said storage locations, and when said data is determined to not be in said data buffer, respond to a request to read data by reading the data from a first number of said storage locations once the data has been read from the at least one memory device, wherein an arbiter having a clock frequency and configured to, responsive to a determination that a received request to read data is for data that is not in the read port's data buffer, be able to read at a pre-determined time, data of a second bit width from the at least one memory device on behalf of one of the read ports, the second bit width being greater than the first bit width, and to write the read data into a second number of storage locations of the data buffer of the read port on whose behalf the data was read, wherein the arbiter is configured to be able to read, during every clock cycle of the arbiter, said data from the at least one memory device on behalf of one of the read ports, and to write the read data into a second number of storage locations of the data buffer of the read port on whose behalf the data was read, and wherein the second number of storage locations written to by the arbiter, the clock frequency of the arbiter, the first number of storage locations read by said read port and the clock frequency of that read port provide that the bandwidth of data written to the read port by the arbiter is greater than the bandwidth of data read from the read port.

10. A memory controller according to claim 9, wherein, in response to a read port determining that a read request is for data not in that read port's data buffer, the arbiter is configured to read pre-fetch data, different from the data requested in said read request, from said at least one memory device on behalf of the read port and to write the pre-fetch data into the data buffer of that read port.

11. A memory controller according to claim 9, wherein the memory controller is configured to, in response to a first read port determining that a received request to read data is for data not in the data buffer of the first read port, determine whether the data is in the data buffer of one or more other read ports, and if it is, is configured to allow the first read port to respond to said read request by reading the data from a first number of storage locations in the data buffer of said other read ports.

12. A memory controller according to claim 9, wherein the clock frequency of the arbiter is substantially equal to the clock frequency of each read port.

13. A method for providing shared access to at least one memory device via a plurality of write ports, the method comprising:
receiving, at one of a plurality of write ports, said write port having a clock frequency and comprising a data buffer having a plurality of storage locations, data of a first bit width and writing the received data to at least a first number of storage locations in the data buffer at a pre-determined time;
receiving, at an address buffer, one or more addresses to be written to a first number of address locations in the address buffer;
translating, at an address translator, said one or more addresses address associated with data written to said first number of storage locations in the data buffer from an address space of the write port to an address space of at least one memory device, such that an address contained in a given address location in the address buffer relates to a memory address of at least one memory device to which data held in a corresponding storage location of the data buffer of the write port is to be written;
determining if a plurality of translated addresses stored in the address buffer relate to a common memory address of the at least one memory device;
responsive to a determination that a plurality of translated addresses stored in an address buffer relate to a common memory address of at least one memory device, reading, at an arbiter having a clock frequency, data of a second bit width from a second number of storage locations of a data buffer associated with said plurality of translated addresses at a pre-determined time and writing the data that is read to said at least one memory device, the second bit width being greater than the first bit width;
wherein said data buffer is configured to allow data to be written to a first number of its storage locations during every clock cycle of the write port, and wherein said arbiter is configured to be able to read said data during every clock cycle of the arbiter, and
wherein the second number of storage locations read by the arbiter, the clock frequency of the arbiter, the first number of storage locations written to said write ports and the clock frequency of said write port provide that the bandwidth of data read from said write port by the arbiter is greater than the bandwidth of data written to said write port.

14. A method according to claim 13, wherein the second number of storage locations read at the arbiter are storage locations having addresses in said address buffer that relate to a first memory address in the at least one memory device.

15. A method according to claim 13, comprising writing update data to one or more update storage locations of the data buffers of one or more write ports in response to the update data being written to one or more storage locations of the data buffer of a first write port, on the basis of a relationship between the corresponding addresses of the one or more update storage locations and the corresponding addresses of the one or more storage locations of the first write port in which the update data is written.

16. A method according to claim 13, wherein the clock frequency of the arbiter is substantially equal to the clock frequency of each write port.

17. A method according to claim 13, comprising enabling, at a write port, the arbiter to read data from storage locations in the data buffer of the write port in response to receiving a flush signal.

18. A method according to claim 13, wherein the arbiter includes a scheduler and comprising:
at the scheduler, selecting a different one of the write ports during different clock cycles of the arbiter, and
reading, at the arbiter, said data from a second number of storage locations of the data buffer of the write port selected by the scheduler.

19. A method according to claim 13, the method comprising:
responding, at one of a plurality of read ports, said read port having a clock frequency and comprising a data buffer having a plurality of storage locations capable of containing data read from at least one memory device, to a request to read data by:
when said data is in said data buffer, reading the data from a first number of said storage locations, and
when said data is not in said data buffer, reading the data from a first number of said storage locations once the data has been read from the at least one memory device; and reading, at an arbiter having a clock frequency, data from the at least one memory device on behalf of one of the read ports at a pre-determined time, and writing the read data into a second number of storage locations of the data buffer of the read port on whose behalf the data was read, wherein the second number of storage locations written to by the arbiter, the rate at which the second number of storage locations are written to by the arbiter, the first number of storage locations read by said read port and the rate at which the first number of storage locations of that read port are read provide that the bandwidth of data written to the read port by the arbiter is greater than or equal to the bandwidth of data read by the read port.

20. A method according to claim 19, comprising:

writing update data to one or more update storage locations of the data buffers of one or more read ports in response to said update data being written to one or more storage locations of the data buffer of a first write port, on the basis of a relationship between corresponding memory addresses of the one or more update storage locations and corresponding memory addresses of the one or more storage locations of the first write port in which said update data is written.

21. A method for providing shared access to at least one memory device via a plurality of read ports, the method comprising:

responding, at one of a plurality of read ports, said read port having a clock frequency and comprising a data buffer having a plurality of storage locations capable of containing data read from at least one memory device, to a request to read data of a first bit width, said request having an associated address relating to an address space of the read port, by:

translating said address from the request from an address relating to an address space of the read port to an address space of at least one memory device;

storing said translated address in an address buffer;

determining if the received request to read data is for data in the read port's data buffer on the basis of a relationship between the at least one address included in the request and at least one translated address stored in the read port's address buffer;

when it is determined that said data is in said data buffer, reading the data from a first number of said storage locations, and when it is determined that said data is not in said data buffer, reading the data from a first number of said storage locations once the data has been read from the at least one memory device, and when said data is not in said data buffer, reading, at an arbiter having a clock frequency, data of a second bit width from the at least one memory device on behalf of one of the read ports at a pre-determined time, the second bit width being greater than the first bit width, and writing the read data into a second number of storage locations of the data buffer of the read port on whose behalf the data was read, wherein the arbiter is configured to be able to read, during every clock cycle of the arbiter, said data from the at least one memory device on behalf of one of the read ports, and to write the read data into a second number of storage locations of the data buffer of the read port on whose behalf the data was read, and wherein the second number of storage locations written to by the arbiter, the clock frequency of the arbiter, the first number of storage locations read by said read port and the clock frequency of that read port provide that the bandwidth of data written to the read port by the arbiter is greater than the bandwidth of data read from the read port.

22. A method according to claim 21, comprising:

reading, at the arbiter, in response to a read port determining that a read request is for data not in that read port's data buffer, pre-fetch data, different from the data requested in said read request, from said at least one memory device on behalf of the read port and writing the pre-fetch data into the data buffer of that read port.

23. A method according to claim 21, comprising:

determining, in response to a first read port determining that a received request to read data is for data not in the data buffer of the first read port, whether the data is in the data buffer of one or more other read ports, and if it is, enabling the first read port to respond to said request by reading the data from a first number of storage locations in the data buffer of said other read ports.

24. A method according to claim 21, wherein the clock frequency of the arbiter is substantially equal to the clock frequency of each read port, and wherein the second number of storage locations written to by the arbiter and the first number of storage locations read by each read port provide that the bandwidth of data written to the read ports by the arbiter is greater than the bandwidth of data read from the read ports.

* * * * *